Feb. 19, 1957 J. T. McNANEY 2,782,411
GROUND CONTROLLED AIRCRAFT LANDING SYSTEM
Filed April 28, 1950 10 Sheets-Sheet 1

Inventor
JOSEPH T. McNANEY
By Killman and Kerst
Attorney

Inventor
JOSEPH T. MC NANEY
By Killman and Kerst
Attorney

Feb. 19, 1957 J. T. McNANEY 2,782,411
GROUND CONTROLLED AIRCRAFT LANDING SYSTEM
Filed April 28, 1950 10 Sheets-Sheet 4

Inventor
JOSEPH T. McNANEY

By Killman and Kerst
Attorney

Feb. 19, 1957 J. T. McNANEY 2,782,411
GROUND CONTROLLED AIRCRAFT LANDING SYSTEM
Filed April 28, 1950 10 Sheets-Sheet 5

Inventor
JOSEPH T. MC NANEY

By Killman and Kerst
Attorney

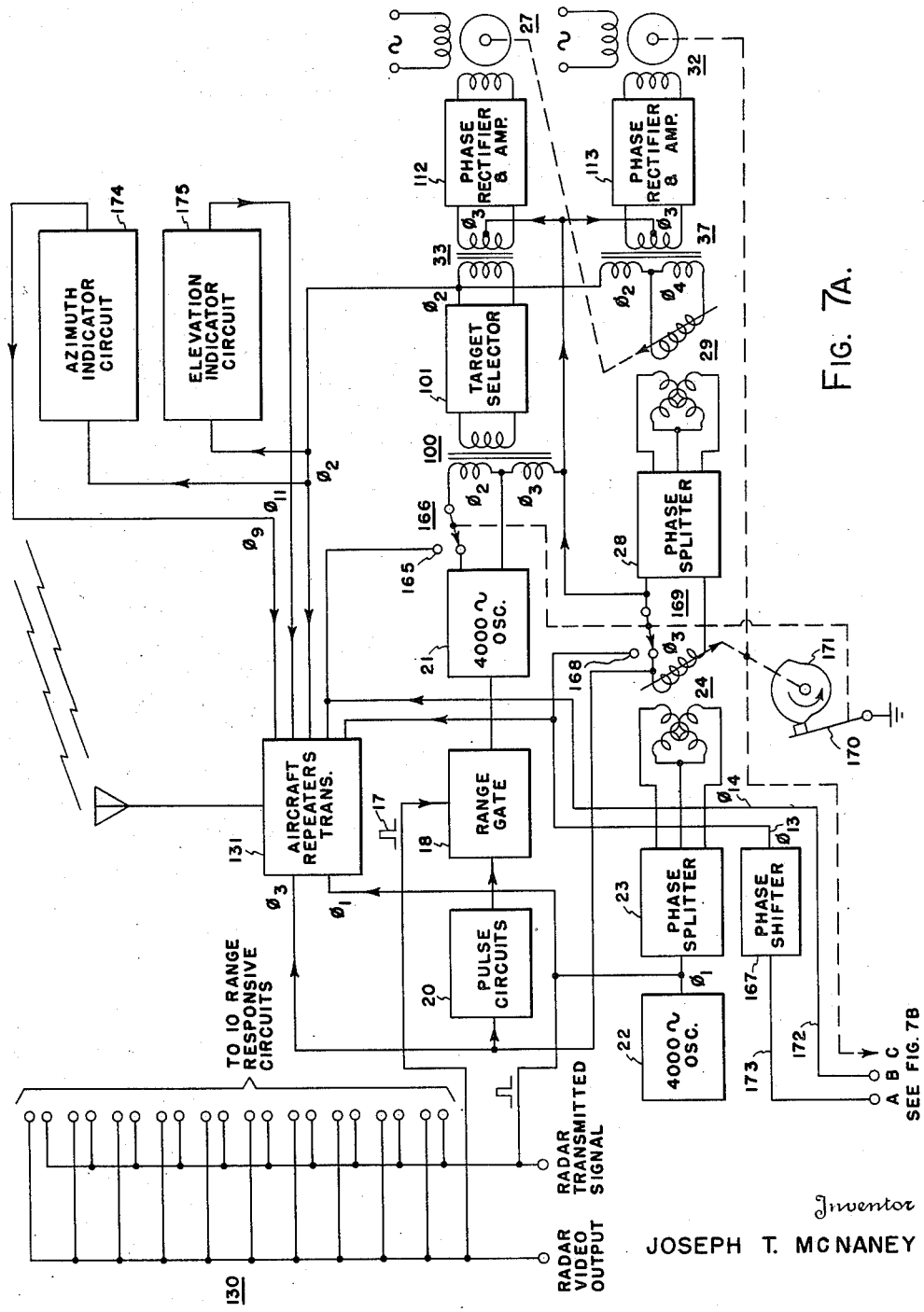

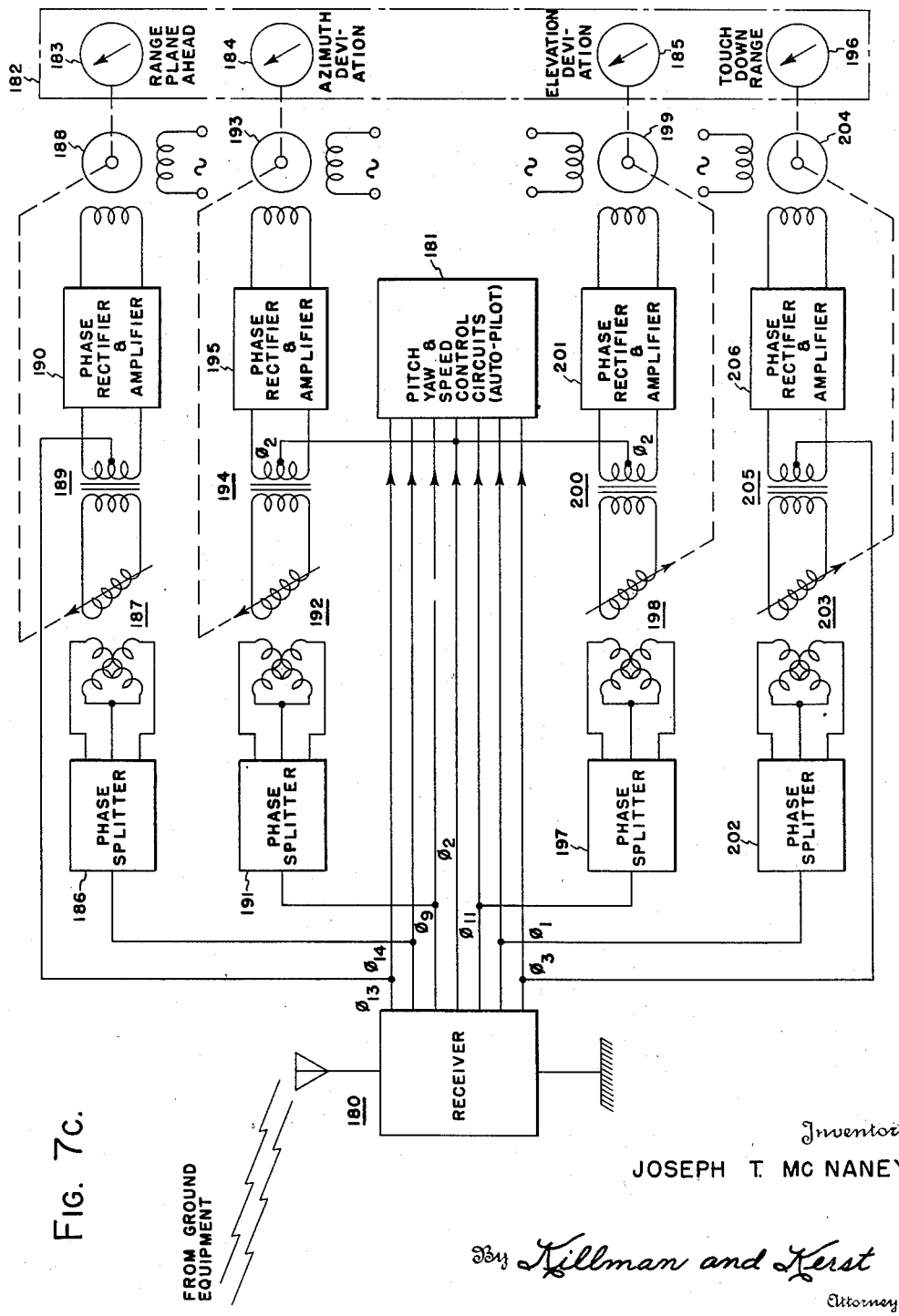

Inventor
JOSEPH T. MC NANEY
By Killman and Kerst
Attorney

United States Patent Office 2,782,411
Patented Feb. 19, 1957

2,782,411

GROUND CONTROLLED AIRCRAFT LANDING SYSTEM

Joseph T. McNaney, Towson, Md., assignor to Bendix Aviation Corporation, Towson, Md., a corporation of Delaware Application April 28, 1950, Serial No. 158,678

45 Claims. (Cl. 343—7.3)

This invention relates to the ground controlled landing of aircraft under conditions of low visibility.

Systems for this purpose have been devised in the past but these, for the most part, have been limited to the control of a single aircraft and have involved the use of several skilled operators to interpret the indications of the system and to convey the results of their interpretation to the craft under control. The means provided by these systems for the indication of the location of the craft with respect to the glide path require at best the interpretation and correlation of separate indications for each of the coordinates used to determine the position.

There is no certainty with existing systems that an indication of a craft on the glide path will not be confused with indications of other craft or objects in the vicinity. Among the objects of the invention are the following:

To provide improved methods of and means for indicating the position of aircraft with respect to a predetermined line such as a glide path;

To provide means which will portray, on one instrument face, a correlated indication of the position of an aircraft with respect to a desired glide path;

To provide a mechanically actuated position indicating means which lends itself readily to the actuation of repeater indicators;

To provide a position indicating means which will automatically follow an acquired target;

To provide a position indicating means which is selective with respect to an acquired target;

To provide a position indicating means which discriminates against targets having a velocity relative to a desired glide path which differs from that of a desired target;

To provide a system for the ground controlled landing of aircraft which is capable of simultaneously controlling more than one aircraft; and To provide a system for the ground controlled landing of aircraft which generates signals of a type readily transmitted to an aircraft for utilization there for the indication of the position of the craft or for its automatic control.

These and other objects and advantages of the invention are realized by an arrangement in which a radar system scans alternately along respective intersecting paths to illuminate areas containing a glide path and in which mechanically operated indicators of range and of the azimuth and elevation of the target with respect to the glide path are provided, the indications appearing on a single dial face. These indications are obtained by phase comparison of waves synchronized with the pulse output of the radar transmitter and the video return from a desired target and the utilization of the phase difference and its integral to actuate servo systems. The servo systems drive the indicator mechanism and control gating pulses to cause the arrangement to selectively follow the desired target. The arrangement is made discriminatory with respect to target speed by the use of a rate responsive gating circuit.

Provision may be made for the transmission of the servo signals to the controlled craft for the actuation of indicators or flight controls there.

The arrangement is adapted for the simultaneous control of a number of aircraft by the provision of a plurality of sets of range, azimuth and elevation determining circuits mechanically interlocked through their range responsive servo motors in a manner such that each in turn becomes responsive to the reception of target echo signals from targets at a predetermined range limit.

Referring now to the drawing.

Figure 7B:
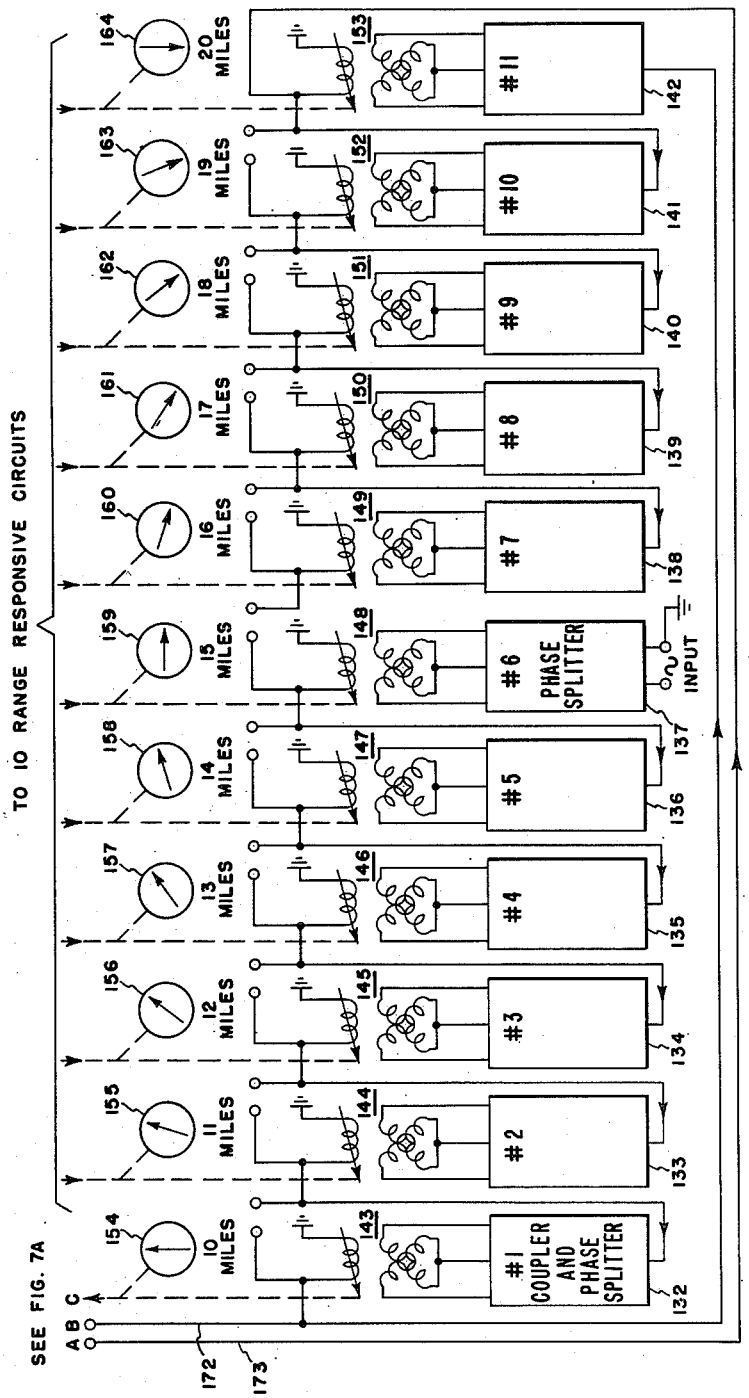
Figure 8:
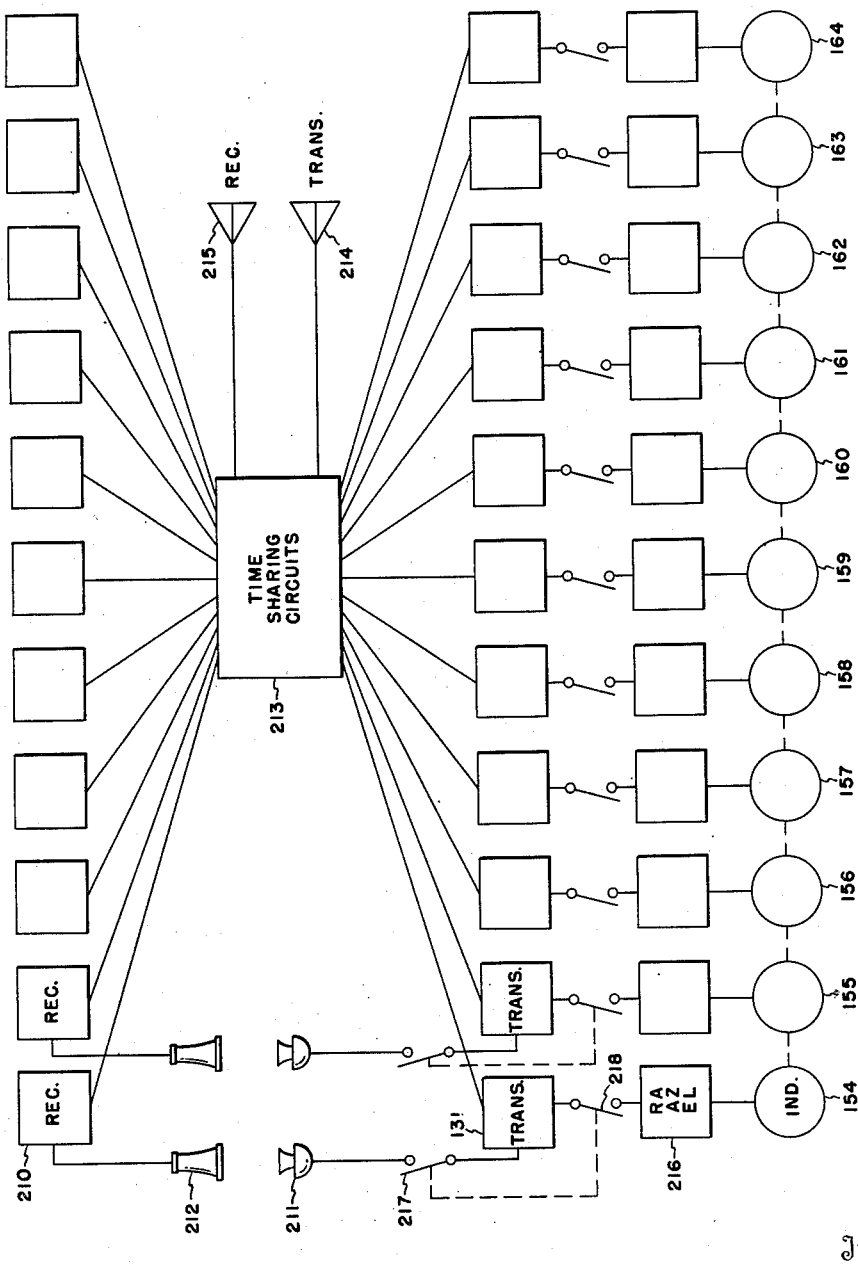
Figure 9:
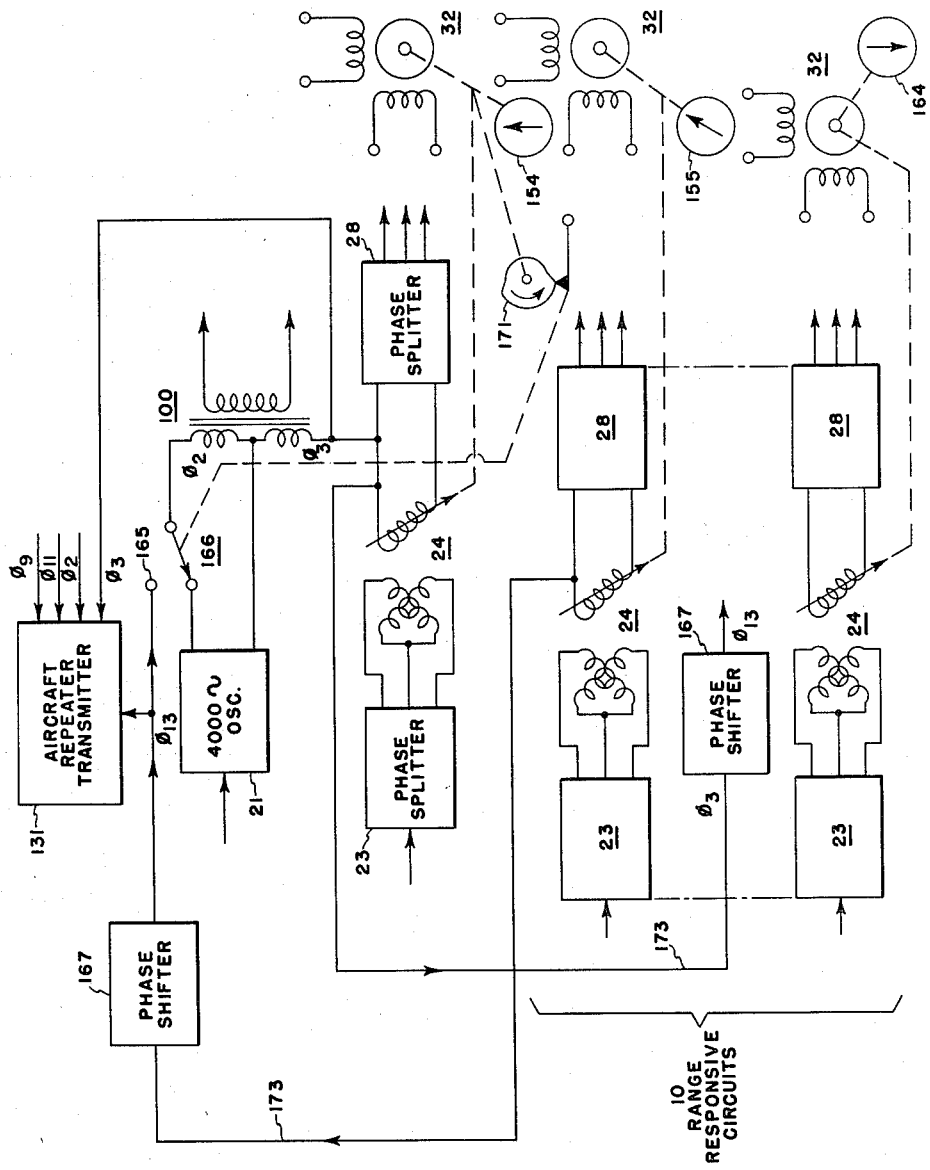

Figs. 7A, B and C constitute a circuit diagram, partly in block form and partly schematic, of a form of the invention adapted for the simultaneous control of a plurality of aircraft; and, Fig. 8 is a block diagram of the group of circuits of Figs. 7A and 7B, illustrating a time sharing arrangement employed with them; and Fig. 9 is a partial circuit diagram of an alternative form of the invention adapted for the simultaneous control of a plurality of aircraft.

Figure 1:
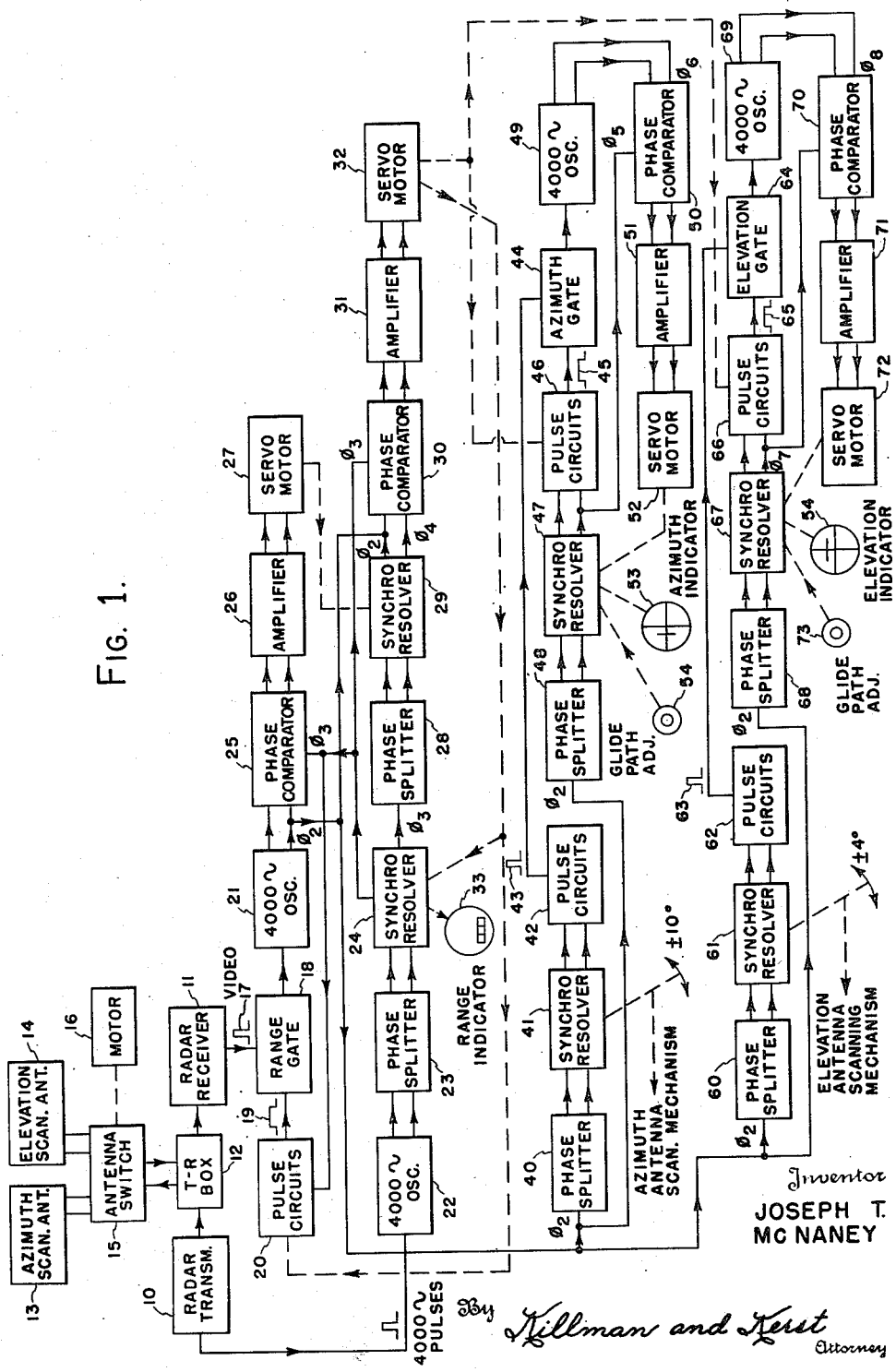
Fig. 1 is a block diagram of an arrangement embodying one form of the invention.

Referring more particularly to the drawing, the arrangement illustrated in Fig. 1 may operate from information provided by known types of ground controlled approach (GCA) systems. One of these is indicated in block form as comprising a radar transmitter 10 and a radar receiver 11, transmitting and receiving signals through a T–R box 12. The system utilizes two antennas, an azimuth scanning antenna 13, and an elevation scanning antenna 14, which scan in horizontal and vertical directions respectively, to illuminate areas including a desired glide path. An antenna switch 15 driven by a motor 16 is provided to alternately switch antennas 13 and 14 into the system.

The video output of the receiver 11, which is indicated by the graph 17, is applied to a range gate 18, to which is also applied gating pulses of the form indicated by graph 19, derived from pulse circuits 20. The video signals which coincide with the gating pulses 19 are applied to determine the phase of the output of the oscillator 21, which is indicated as having an output frequency of 4,000 cycles. This frequency is selected merely by way of example to coincide with a typical repetition rate utilized in GCA radar systems. The phase of the output of this oscillator is indicated as $\phi_2$.

The system also includes an oscillator 22 having a 4,000 cycle output, the phase of which is determined by the pulses of the radar transmitter 10 which have a repetition rate of 4,000 cycles. The output of oscillator 22 is applied to a phase splitter 23, the output of which is applied to the stator of a synchro resolver 24. The output of this resolver has a phase which is indicated as $\phi_3$. This output and the output of oscillator 21 are fed to a phase comparator 25. This device has an output the sense and magnitude of which are functions of the sense and magnitude of the phase difference between $\phi_2$ and $\phi_3$. This current is amplified by an amplifier 26 and applied to the control of a servo motor 27.

The $\phi_3$ current from synchro resolver 24 is passed through a phase splitter 28 to the stator of a synchro resolver 29, the rotor of which is positioned by the servo motor 27. The output of synchro resolver 29 may be considered as having a phase $\phi_4$. This current is additively combined with the current having phase $\phi_2$ and the resultant is combined in a phase comparator 30 with the $\phi_3$ current from synchro resolver 24. The output of phase comparator 30 is amplified in an amplifier 31 and applied to the control of a servo motor 32. This servo motor mechanically controls the position of the rotor of synchro resolver 24 and controls the phase or time of occurrence of the gating pulses 19 produced by pulse circuits 20. This motor likewise mechanically controls pulse circuits in portions of the system deriving azimuth and elevation indications which will be described hereafter.

The rotor of the synchro resolver 24 mechanically drives a range indicator 33 which may be of the counter type.

The portion of the arrangement of Fig. 1 which has been described has to do primarily with the determination of the range of an acquired target. Once a target has been acquired, the system will selectively follow the target and indicate its range as it proceeds along the glide path toward the touch down point. In order to accomplish this result, the pulse circuits 20 are originally adjusted to provide gating pulses 19 timed for the receipt of echoes from aircraft entering the extreme limit of the desired control area. This limit may be arbitrarily selected and might be, for example, at 10 miles. The occurrence of a video signal at this range would thus serve to initiate oscillations in oscillator 21, which would be phased in accordance with the range of the video signal. The phase of this output is compared in phase comparator 25 with the phase of the output of synchro resolver 24, the phase of this latter output being determined by the pulses transmitted by the radar transmitter 10 and by the position of the resolver rotor as controlled by servo motor 32. The output of the phase comparator 25 being applied to the control of servo motor 27 will cause a movement of that motor which will be a function of an integral of the phase difference between currents $\phi_2$ and $\phi_3$. The phase difference currents derived from phase comparator 25 and 30 are applied to the servo motors 27 and 32 in such a sense as to cause those motors to rotate in proper directions to reduce these currents to zero. The current from the phase comparator 30 is a function of the phase difference between currents $\phi_2$ and $\phi_3$ and an integral of such difference. The position of the rotor of synchro resolver 24 is under these circumstances a function of the range of the craft producing the video responses 17 and thus may be used as an indication of that range.

The width of the gating pulses 19 is controlled as a function of range by virtue of a mechanical connection between the rotor of synchro resolver 24 or servo motor 32 and the pulse circuits 20. With an admittance range of 10 miles, the width of the pulses 19 may be varied from 10 microseconds, at the extreme range, to $\frac{1}{10}$ microsecond at touch down. This serves to increase the selectivity of the system as the craft approaches the touch down point.

The $\phi_3$ current is also coupled to the pulse forming circuits 20 where it is utilized to vary the time occurrence of the pulses 19 in a direction such that the video pulses 17 occur at the mid-point of the gating pulse. By virtue of this feature, the range gate, once a target has been accepted, follows that target and serves to prevent interference from other targets.

Figure 2:
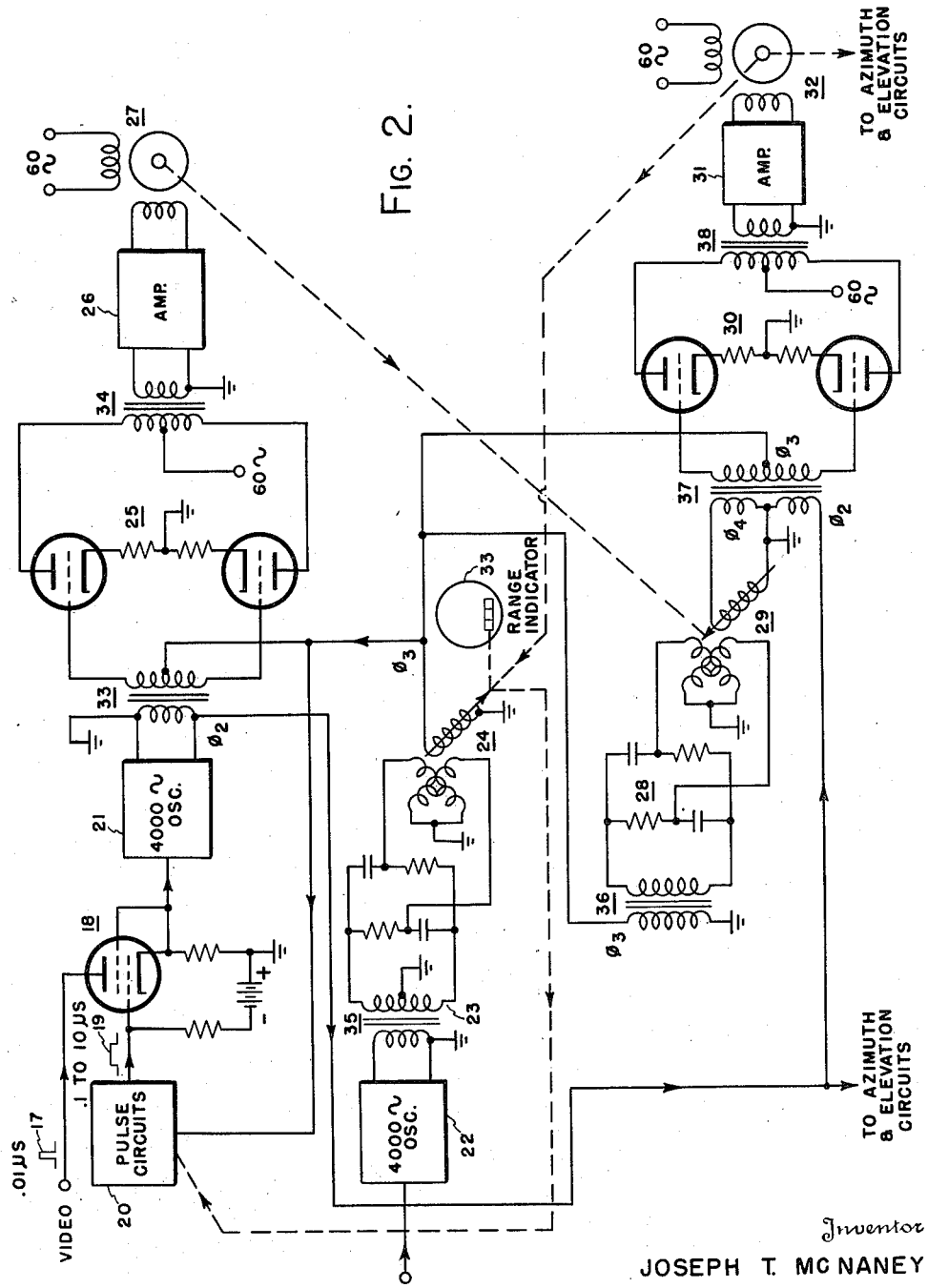
Fig. 2 is a circuit diagram in schematic form showing the portion of the circuit of Fig. 1 which applies to range.

The portion of the arrangement of Fig. 1 which has just been described is shown in more detail in Fig. 2. The range gate 18 is illustrated as a coincidence circuit, having the video pulses 17 applied to the anode thereto and the gating pulse 19 applied to its control grid. It can be seen that this tube will not conduct except when a pulse 17 occurs during one of the pulses 19.

The phase comparators 25 and 30 are indicated as conventional two-tube phase discriminator circuits. The circuit 25 is coupled to the output of the oscillator 21 through a transformer 33 to the primary of which the current $\phi_2$ is applied. The secondary of this transformer is center-tapped and the current $\phi_3$ is applied to the center-tap. An output transformer 34 couples the output of the circuit 25 to the amplifier 26, which is in turn connected to one winding of a two-phase low inertia induction motor 27. Sixty-cycle current is applied to the plates of the tubes of the circuit 25 and to the remaining winding of motor 27.

The oscillator 22 is coupled to a phase splitting circuit 23 by a transformer 35. The phase splitting circuit 23 is of a conventional type employing an RC network which supplies two output currents of quadrature-phase to the stator windings of the synchro resolver 24. The phase splitting circuit 28 to which the current $\phi_3$ is coupled by transformer 36 is similar to the circuit 23. The output $\phi_4$ of resolver 29 is applied cross one-half of the primary winding of a transformer 37. Current of phase $\phi_2$ is applied to the other half of the primary and current of phase $\phi_3$ is applied to the center-tap of the secondary. The secondary of this transformer is connected to the control grids of the tubes of phase discriminator 30 and the output is coupled by transformer 38 to amplifier 31, which is connected to one winding of the two-phase induction motor 32.

The pulse circuits 20 may be any of a number of circuits of the multivibrator type. The Phantastron circuit, for example, as illustrated and described on pages 270 and 271 of the book "Reference Data for Radio Engineers," 3rd edition, published by Federal Telephone and Radio Corporation, could be employed. The triggering of such a circuit may be accomplished by a sine wave input such as $\phi_3$ and the width of the pulses controlled through the adjustment of a potentiometer as by the rotor of resolver 24.

Referring again to Fig. 1, there are shown below the range responsive circuits described above, circuits responsive to the aizmuth and elevation of an acquired target with respect to the desired glide path. The azimuth responsive circuits comprise a phase splitter 40, to which is applied current of phase $\phi_2$ from the output of oscillator 21. The quadrature-phased components of this current are applied to the stator of synchro resolver 41. The rotor of this resolver is mechanically connected to the azimuth antenna scan mechanism and is reciprocated in unison therewith through an arc of $\pm 10°$. The output of this circuit will be a waveform having a phase depending upon the time of reception of video response 17 with respect to the reciprocal movement imparted to the rotor of the resolver 41. This waveform is applied to the pulse circuits 42 which produce pulses as indicated at 43, the time of occurrence of which is likewise dependent upon the time relationship of the video response 17 and the azimuth antenna scan movement. These pulses are applied to an azimuth gate circuit 44. Also applied to the gate circuit are gating pulses 45 generated in pulse circuits 46. The time occurrence of the pulses 45 is governed by the output of a synchro resolver 47. To the stator of this resolver are applied quadrature components of the current $\phi_2$ by way of phase splitter 48.

The pulses 43 are applied through azimuth gate 44 to a 4,000 cycle oscillator 49. The output of this oscillator is phased in accordance with the timing of pulses 43 and is applied to a phase comparator 50. The phase of this current is indicated as $\phi_6$. The output of synchro resolver 47 having phase $\phi_5$ is also applied to this comparator and the resultant of the phase comparison of these inputs is amplified in an amplifier 51 and applied to the control of a servo motor 52 which drives the rotor of synchro resolver 47. The position of the rotor of this resolver is a function of the azimuth of the target with respect to the arc scanned by the azimuth antenna and an azimuth indicator 53 is therefore mechanically connected to this rotor.

Since the GCA apparatus may, of necessity, be positioned to one side of the glide path, it may be necessary to introduce a compensating correction for this circumstance in order to provide an azimuth indication which is correct. For this purpose a glide path adjustment means 54 may be provided to either manually or automatically adjust the position of the stator resolver 47 as the plane proceeds along the glide path.

The width of the gating pulses 45 should be varied as a function of the range of the target and this is accomplished by a mechanical connection from the servo motor 32 to the pulse circuits 46.

The elevation responsive circuits are similar to the azimuth responsive circuits described above. Current of phase $\phi_2$ is applied to a phase splitter 60, the output of which is fed to the stator of a synchro resolver 61. The rotor of this resolver is mechanically connected to the elevation antenna scan mechanism and is reciprocated in unison therewith through an arc of ±4°. The output of resolver 61 is applied to pulse circuits 62 which produce a train of pulses 63 having a time of occurrence which is a function of the time of the occurrence of video response 17 with respect to the scan of the elevation antenna. The pulses 63 are applied to an elevation gate circuit 64 to which are also applied gating pulses 65 generated by pulse circuits 66. The time of occurrence of the gating pulses 65 is governed by the output of a synchro resolver 67 to the stator of which are applied quadrature components of a current having a phase $\phi_2$ by way of phase splitter 68. The pulses 63, after passing through the elevation gate 64, are applied to a 4,000 cycle oscillator 69, in which is generated a sign wave output having a phase $\phi_8$ governed by these pulses. This current is applied to a phase comparator 70 to which is also applied a portion of the output of synchro resolver 67 having the phase $\phi_7$. The result of this phase comparison is applied through amplifier 71 to the control of servo motor 72 which drives the rotor of synchro resolver 67. Since the position of this rotor is a function of the elevation at which the video responses 17 are received, it is mechanically connected to an elevation indicator 54.

Since the desired glide path of an aircraft approaching a landing is not a straight line but curves downwardly, it is necessary to apply an adjustment to the stator of resolver 67 in order to obtain an indication of elevation with respect to a fixed indication of a desired glide path reference level which indicates coincidence with the desired glide path when the aircraft is following a downwardly curved path. This may be accomplished by a manually or mechanically driven adjustment device which operates as a function of range. Such devices are known and one is indicated here at 73 as being mechanically connected to the synchro resolver 67.

Figure 3:
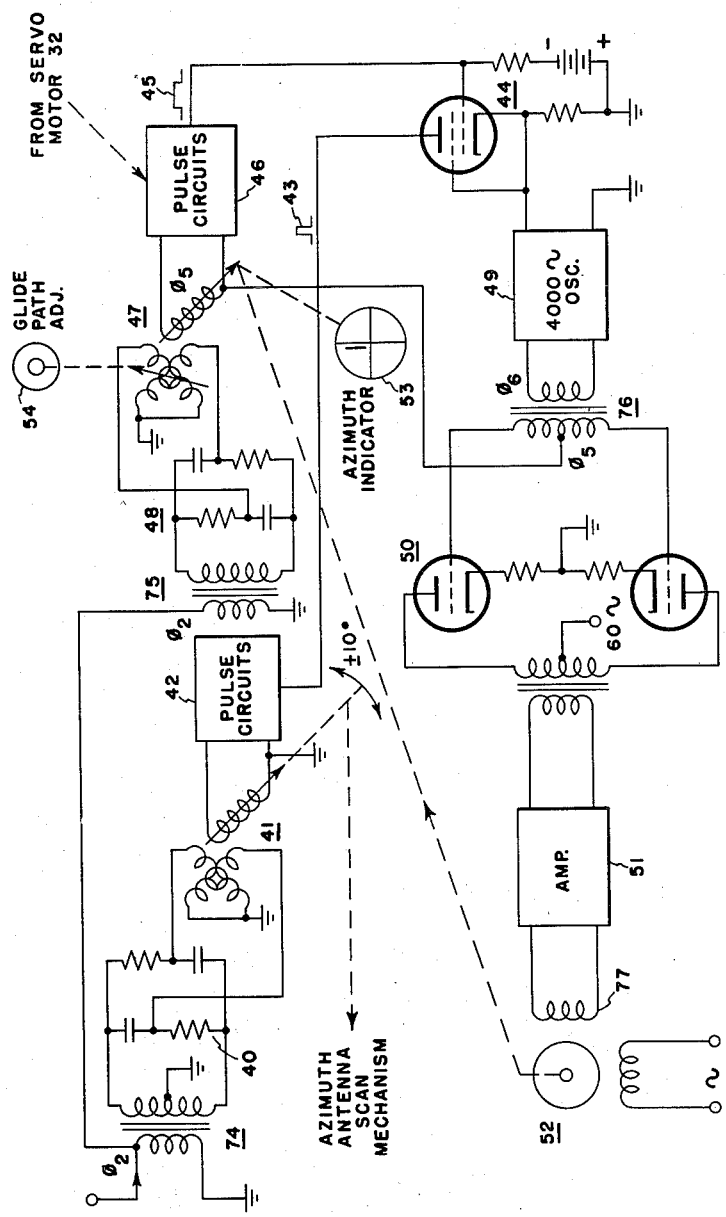
Fig. 3 is a diagram like Fig. 2 showing the portion of the circuit of Fig. 1 which applies to azimuth.

Fig. 3 illustrates in more detail the circuit which was described above as responsive to the azimuth of the received video signal. Current of the phase $\phi_2$ is shown as applied to the primary of a transformer 74, the secondary of which is connected to a conventional RC phase splitting network 40, the outputs of which are applied to the stator windings of the conventional synchro resolver 41. The rotor of this resolver is shown as mechanically connected to the azimuth antenna scan mechanism and as being reciprocated through an arc of ±10°. The rotor is connected to pulse circuits 42, the output of which is applied to the anode of an azimuth gate circuit 44 which is shown as a conventional coincidence tube circuit. To the control grid of this circuit are applied gating pulses 45 derived from pulse circuits 46. The pulse circuits 46 are shown as connected to the rotor of a synchro resolver 47, the stator of which is supplied with quadrature components of a current $\phi_2$ by virtue of connections to an RC network forming a phase splitting circuit 48. This circuit is fed from the secondary of a transformer 75 to the primary of which is applied current of phase $\phi_2$. The pulses 43, being passed by gate circuit 44, are applied to oscillator 49, the output of which is applied to the primary of a transformer 76. The secondary of this transformer is connected to the control grids of a conventional two-tube phase discriminator circuit 50. The secondary of this transformer is center-tapped and to this tap is applied a current of phase $\phi_5$. The output of circuit 50 is amplified in an amplifier 51 which is connected to a winding 77 of a two-phase low inertia induction motor 52. The rotor of resolver 47 is mechanically driven by the motor 52 and is connected to position an azimuth indicator 53. The stator of resolver 47 is adjusted by the glide path adjustment 54. Since the components of the elevation responsive circuits are identical with those of the azimuth responsive circuits, no detailed illustration of the elevation responsive circuit has been made.

Figure 5:
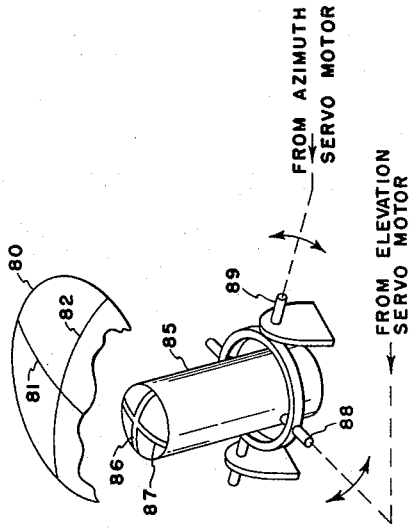
Fig. 5 is a perspective view of the indicator of Fig. 4.
Figure 4:
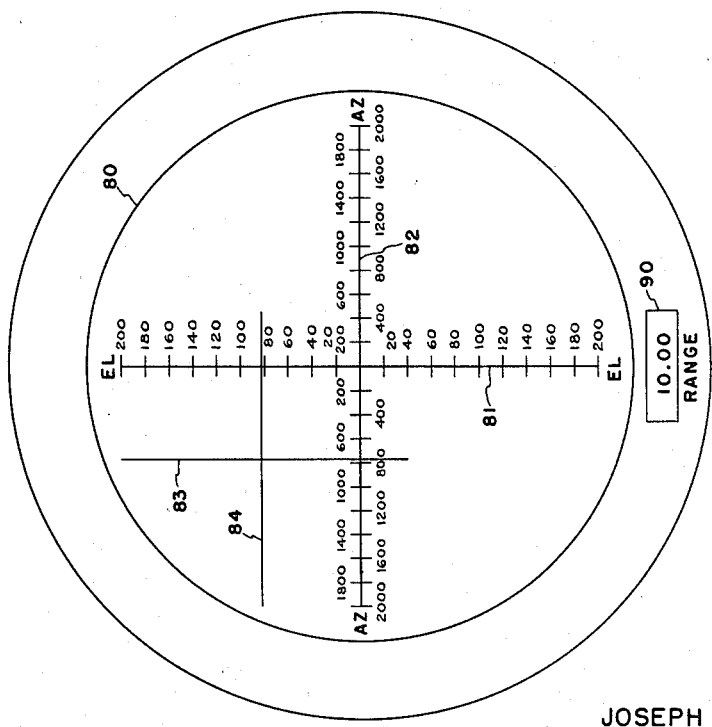
Fig. 4 is a plan view of the face of one form of indicator usable with the arrangement of Fig. 1.

Since the outputs of the range, azimuth and elevation portions of the arrangement of Fig. 1 are mechanically transmitted forces, they may be used to actuate respective portions of a single indicating instrument such, for example, as the one illustrated in Figs. 4 and 5. The three portions of the circuit of Fig. 1 have been shown as actuating respective indicating elements which are shown combined in the one instrument of Figs. 4 and 5. Referring now to the latter figures, there is shown in Fig. 4 a dial face 80 having a vertically extending scale 81 provided with elevation indicating markings and crossing at a horizontally extending scale 82 carrying markings indicative of azimuth. The instrument is provided with a means for projecting crossed lines of light upon the dial face, these lines being parallel respectively to the scales 81 and 82. Such lines are indicated on Fig. 4 as 83 parallel to scale 81 and 84 parallel to scale 82. When these lines coincide with their respective scales, the aircraft is following the glide path exactly. A position of the line 83 to the left of scale 81 indicates that the craft is to the left of the glide path and a position of the line 84 above the azimuth scale indicates that the elevation of the aircraft exceeds the glide path elevation at this range. The intersection of the vertical line 83 with the azimuth scale provides a numerical reading of its error in azimuth and the intersection of the line 84 with the elevation scale indicates its error in elevation.

Fig. 5 shows schematically the mechanism of an exemplary form of the indicator. The lines of light 83 and 84 are produced within a tube 85 having crossed slots 86 and 87 formed in its upper end. The tube contains an illuminating means which projects light through the crossed slots. It is mounted on trunnions 88 and 89 in a well known manner for movement in accordance with the positions of the rotors of synchro resolvers 47 and 67 respectively. If desired the tube 85 may produce only a spot of light at the intersection of slots 86 and 87 and the dial may be marked with a grid of reference lines.

The rotor of the synchro resolver 24 of the range responsive portion of the circuit of Fig. 1 drives a counter type of indicator, the face of which is shown at 90 in Fig. 4. Counter 90 may be combined as shown in the same instrument with the azimuth and elevation indications.

Figure 6:
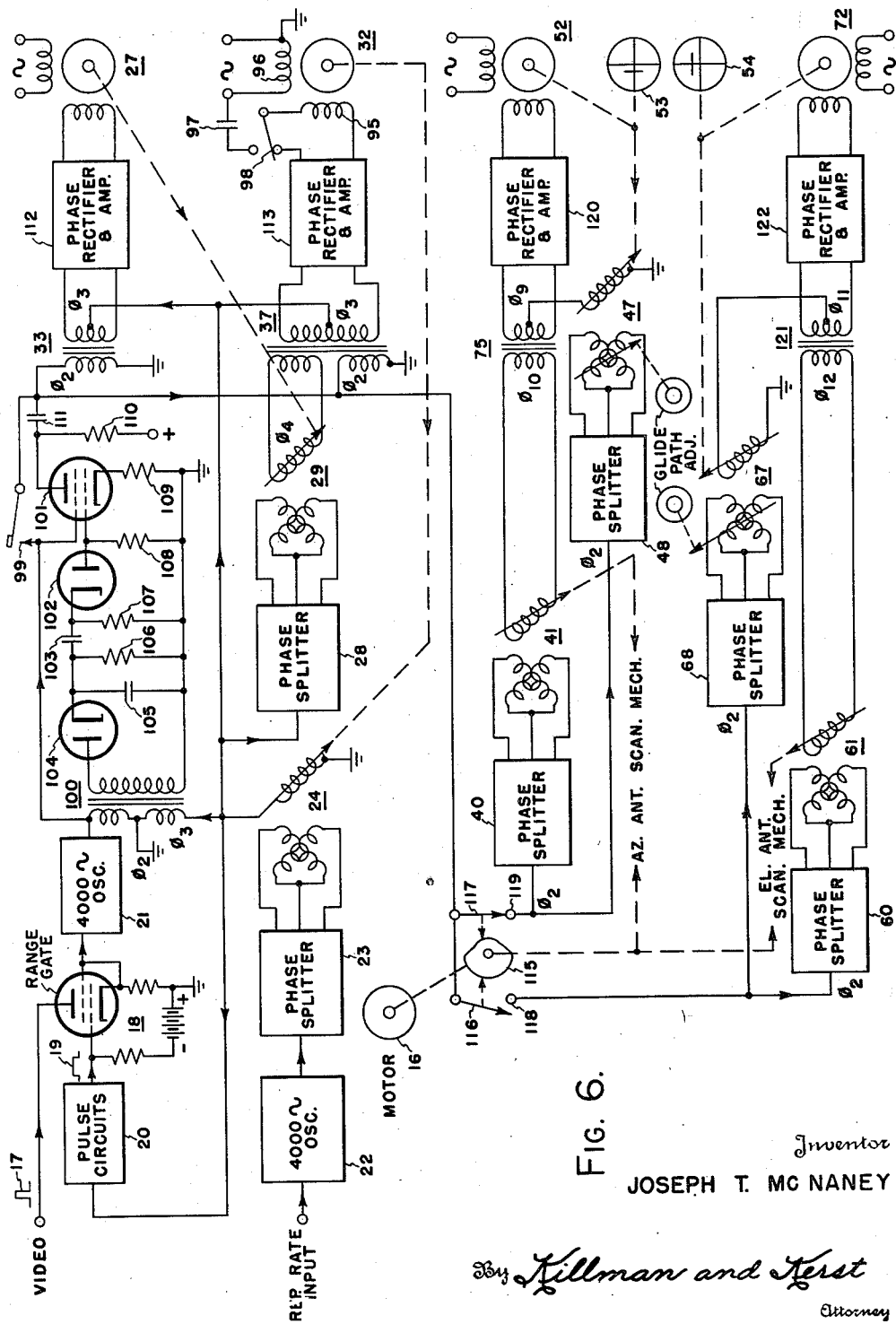
Fig. 6 is a circuit diagram partly in block form and partly schematic, showing a second form of the invention incorporating a rate selective gating circuit.

Fig. 6 shows a form of the invention provided with a means which renders it selective with respect to target velocity as well as target range. The range responsive portion of this arrangement is similar to that of Fig. 1, except that a velocity selective means has been inserted following the 4,000 cycle oscillator 21. The output of this oscillator is applied to one-half of the primary winding of a transformer 100. The output of resolver 24 is applied to the other half of this primary, the center-tap of which is grounded. The output of oscillator 21 is also applied to the screen grid of a target selector tube 101. The control grid of this tube is connected to the anode of a rectifier 102, the cathode of which is connected by way of a condenser 103 to the cathode of a rectifier 104. The anode of this rectifier is connected to one terminal of the secondary of transformer 100, the other terminal being grounded. A condenser 105 and a resistor 106 are connected in parallel between the junction of condenser 103 and the cathode of rectifier 104 and ground. A resistor 107 is connected between the junction point of condenser 103 and the cathode of rectifier 102 and ground. A resistor 108 is connected between the control grid of tube 101 and ground. The cathode of tube 101 is grounded through a resistor 109. A load resistor 110 is provided for tube 101, the output of the tube being taken across this resistor and applied through a coupling condenser 111 to the primary of transformer 33 and one-half of the primary of transformer 37. The outputs of these transformers are applied to a phase rectifier and amplifier 112 and to a phase rectifier and amplifier 113, the outputs of these circuits being applied to the control of servo motors 27 and 32 respectively. The output of circuit 113 is applied to one winding 95 of the field of motor 32, the remaining winding 96 being connected to a reference source of 60 cycle voltage.

For use in conditioning the system for the acquisition of a target, one side of winding 95 is grounded and the remaining terminal is connected by a single pole, double throw switch 98 to the circuit 113. The upper contact of the switch is connected by a condenser 97 to the reference 60 cycle source.

Some means must be provided to cut out the velocity selective portion of the system until such time as a current of phase $\phi_3$ has been developed and the system has settled down to the following of a target. Such a means may be a switch, as the switch 99, which when closed short circuits the tube 101.

In the operation of this form of the invention, the servo motor 32 is first caused to drive the indicator out to the ten mile indication to wait for a target. This may be done by manually operating the switch 98 to its upper position and holding it there until the ten mile indication is reached. At this point it is returned to the position illustrated. With the switch in its upper position the motor 32 will rotate at its maximum speed.

Until the system has settled down to the following of an acquired target the switch 99 is kept closed eliminating the rate sensitive circuit. When the system is following stably, the switch 99 is opened and the rate sensitive circuit will begin to function to exclude targets of other velocities.

When the switch 99 is opened the currents $\phi_2$ and $\phi_3$ applied to the primary of transformer 100 will be in phase-quadrature, the phase of $\phi_2$ lagging that of $\phi_3$ by a constant 90° when the pulses 17 of the video response occur exactly at the center of the gating pulses 19 in the range gate 18. This is the condition which exists when this portion of the circuit is accurately following the target in range.

If now a series of pulses are received which do not maintain coincidence with the mid-point of the pulses 19, the phase of current $\phi_3$ would shift with respect to the phase of current $\phi_2$. Such a condition would exist, for example, upon the receipt of echoes from a stationary target. When such echoes are received current of phase $\phi_2$ may initially aid the effect of $\phi_3$ and then decrease its aiding effect with a shifting of the phase of current $\phi_3$. This will cause the voltage across resistor 106 to, in turn, decrease in value.

Any initial increase in the D. C. voltage across resistor 106 increases the charge on condenser 103. The effect of this charge is, however, blocked from the control grid of tube 101 by virtue of the presence of the rectifier 102. A decrease in this D. C. voltage resulting from the stationary target response will cause a current flow through resistors 107 and 108 in a direction to place a negative charge on the control grid of tube 101. The tube 101 will under such conditions be biased to cut-off. Unless the rate of change of the phase angle of current $\phi_3$ is equaled by the rate of change in the phase angle of current $\phi_2$, a negative potential across the resistor 108 will be developed and the tube 101 will be blocked when a certain potential is reached. The sensitivity of the circuit may be adjusted to exclude all targets excepting the aircraft under control. The remainder of the range responsive portion of this arrangement operates as did the corresponding portion of the circuit of Fig. 1.

In the azimuth and elevation responsive portions of this form of the invention, however, simplification is permitted because of the presence of the velocity selective circuit described above. Current of phase $\phi_2$ is applied to a double-poled switch comprising a cam 115 and two switch arms 116 and 117, coacting with contacts 118 and 119 respectively. The cam 115 has two arcuate portions of different radii which coact with the switch arms 116 and 117 to maintain each arm in contact with its cooperating contact through approximately half the rotation of the cam 115 and out of contact during the remainder of the rotation. The cam 115 is driven in synchronism with the switch of the azimuth and elevation scanning antennas 13 and 14 respectively of Fig. 1. Contact 118 is connected to the elevation responsive portion of the circuit of Fig. 6 and contact 119 is connected to the azimuth responsive portion thereof. Current of phase $\phi_2$ is supplied by this arrangement to phase splitters 40 and 48 of the azimuth responsive portion of the circuit. The output of phase splitter 40 is applied to the stator windings of resolver 41. The rotor of this resolver is reciprocated as in Fig. 1 by the azimuth antenna scan mechanism which is driven by motor 16. The current of phase $\phi_{10}$ produced by resolver 41 is applied to the primary of transformer 75.

The output of phase splitter 48 is applied to the stator windings of a resolver 47, the rotor of which is positioned by servo motor 52. The output of this resolver is current of phase $\phi_9$ which is applied to the center-tap of the secondary of transformer 75. The output of transformer 75 is applied to a phase rectifier and amplifier 120 which supplies control voltage for the servo motor 52.

Current of phase $\phi_2$ is supplied to the phase splitters 60 and 68 of the elevation responsive portion of the circuit from contact 118. The output of phase splitter 60 is applied to the stator windings of synchro resolver 61, the rotor of which is reciprocated as in Fig. 1 by the elevation antenna scan mechanism driven by motor 16. The output of this resolver is current of phase $\phi_{12}$ which is applied to the primary of a transformer 121. The output of phase splitter 68 is applied to the stator windings of synchro resolver 67, the rotor of which is positioned by servo motor 72. The output of resolver 67, which is current of phase $\phi_{11}$, is applied to the center-tap of the secondary of transformer 121. The output of this transformer is applied to a phase rectifier and amplifier 122 which provides control voltage for the servo motor 72. The servo motor 52 drives azimuth indicator 53 and the servo motor 72 drives elevation indicator 54.

Figures 7A, 7B and 7C illustrate a system in which the form of the invention of Fig. 6 is utilized for the simultaneous control of a plurality of aircraft approaching or following a glide path. The system as illustrated is capable of the simultaneous control of as many as ten aircraft separated by intervals of not less than a mile. Means are disclosed for not only indicating the range, azimuth, and elevation of each of the controlled aircraft at one or more ground stations, but also for transmitting this information to the aircraft under control and for utilizing the transmitted information in the craft, either for the indication of the position of the craft or for the control of its flight.

The portion of the system illustrated in detail in Fig. 7A comprises a range responsive servo system similar to the range responsive portion of the arrangement illustrated in Fig. 6. While only one of these range responsive circuits is illustrated, it should be understood that a total of eleven will be required for the control of ten planes in the system illustrated.

The range responsive circuit receives video pulses 17 for the range gate circuit 18 and voltage corresponding to the pulses transmitted by the radar transmitter for the oscillator 22 from a bus system 130 which provides similar voltages for the remaining ten range responsive circuits which are not illustrated. A transmitter 131 is provided for transmitting, to the controlled aircraft, currents from the range, azimuth and elevation indicating circuits necessary for the indication of this information in the aircraft.

For each of the eleven range responsive circuits, there is provided a respective coupler and phase splitter circuit, these circuits being illustrated schematically in Fig. 7B and being numbered 132 to 142 respectively. These circuits have their outputs applied to the stators of synchro resolvers numbered 143 to 153. The rotor of each of these resolvers is mechanically driven by the servo motor 32 of each respective range responsive circuit. Also driven by the servo motor 32 of each of these range responsive circuits are respective range indicators 154 to 164. Each of the units of Fig. 7B comprising a coupler and phase splitter circuit and a synchro resolver connected thereto is connected in series with the adjacent units to form a chain which begins with phase splitter 137 and ends with resolver 149, the output of each synchro resolver being connected to the input of the phase splitter of the next succeeding unit in the chain. The output of each synchro resolver is also applied to a respective transmitter 131 and to a switch contact 165 in its associated range responsive circuit. In the range responsive circuit shown, the output of resolver 143 is connected to transmitter 131 and contact 165 by lead 172, which also connects this output to the input of coupler and phase splitter circuit 142. The switch contact 165 is part of a single pole, double throw switch 166 between the output of oscillator 21 and the primary of transformer 100. The transmitter 131 is also connected by way of a phase shifter 167 to the output of the synchro resolver of the next succeeding unit in the chain of units, of Fig. 7B. In the range responsive circuit shown lead 173 makes this connection to the output of resolver 153. This connection also extends to a contact 168 forming part of a single pole, double throw switch 169 located between the output of synchro resolver 24 and phase splitter 28 of the range responsive circuit. The phase shifter 167 produces a phase shift of 15.4° in voltage applied to it. The output of phase shifter 167 is indicated as having phase $\phi_{13}$ while the current flowing in lead 172 has phase $\phi_{14}$. The switches 166 and 169 are ganged and driven by a cam follower 170 which rides on a cam 171 driven by servo motor 32. The cam 171 is provided with a lateral surface generated by radii of two different lengths, each effective over a part of its circumference, by virtue of which the switches 166 and 169 are closed in one position for part of each rotation of the cam and are closed in the alternative position for the remainder of the rotation. The portion of the cam having the greater radius extends, in the system shown, over an arc of 154°.

Consider the system as initially set-up with the indicator 154 set for a range of ten miles. The indicators for the remaining units of the system will be set at intervals of 15.4° or to show indications separated by one mile intervals. For example, indicator 154 will show ten miles, indicator 155 will indicate eleven miles and the indications of the remaining indicators will each advance by one mile with indicator 164 showing an indication of twenty miles.

With the indicator 154 set at ten miles, the cam 171 of the range responsive circuit illustrated will be in the position shown, with the cam follower 170 having just engaged the raised portion of the cam surface and the switches 166 and 169 will be in the positions shown. In this condition the circuit is in readiness to receive video signals from an aircraft entering the ten mile range which is the extreme range for which the system operates. The cams 171 of the remaining range responsive circuits will be at positions spaced from that of the cam illustrated by successive 15.4° intervals. The cam followers associated with these cams will all be riding on the recessed portions of their associated cams and therefore, the switches 166 and 169 of those circuits will be in their upper positions. In this position they will not be responsive to the receipt of video signals but will be responsive to the phase differences between the synchro resolver of Fig. 7B with which they are associated and the next succeeding phase resolver of the chain. Since the phase shifter 167 produces a phase shift of 15.4° to a voltage applied to it, a resulting phase difference of 0° will be impressed upon these range responsive circuits when a phase difference of 15.4° exists between their leads 172 and 173. Since this is the condition existing in all units of the system in its initial state, all the range responsive circuits will therefore be quiescent and the indicators will be stationary.

Now consider the effect of the entry of an aircraft into the sector being scanned at the ten mile range. The range responsive circuit of Fig. 7A will immediately lock upon it and begin to follow it. When this occurs, the cam 171 of the circuit illustrated will begin to turn in the direction indicated but the position of the cam follower 170 will remain unchanged until the cam has turned through 154°, at which time the aircraft being followed will have come into the zero range or touch down point. However, this movement of the cam 171 is accompanied by a corresponding movement of the rotor of synchro resolver 143. This movement increases the phase difference between the output of this resolver and that of resolver 153 and thus raises the phase difference between leads 172 and 173 above 18°. But this can have no effect upon the range responsive circuit illustrated. There also takes place, however, an increase in the phase difference between resolvers 143 and 144. When this occurs, the range responsive circuit associated with indicator 155 and synchro resolver 144 will begin to operate, to restore the phase difference between the outputs of resolvers 143 and 144 to 18°. This in turn will increase the phase difference between the resolvers 144 and 145 and will initiate activity of the range responsive circuit associated with resolver 145. Corresponding action will occur down through the chain, with the result that indicator 155 will be brought to a ten mile range and all of the other indicators will be advanced by one mile.

When indicator 155 shows a ten mile indication its cam 171 will assume the position of the cam shown in Fig. 7A. When this occurs the range responsive circuit associated with it will be in the condition illustrated in Fig. 7A, waiting for the receipt of echoes from a second plane entering the ten mile range of the scan sector. The circuits associated with indicators 155 to 164 will remain quiescent until such an event occurs, since the phase relations between their respective resolvers of the units of Fig. 7B will not be disturbed.

When the range responsive circuit associated with indicator 155 picks up a plane at the ten mile range and starts to follow it in, the remaining units in the system will follow in the manner described above until indicator 156 has been brought to the ten mile range. All the units will now stop and wait until the range responsive circuit associated with the indicator picks up a plane. The range responsive units associated with indicators 154 and 155 will continue to follow their planes in to the point of touch down. This sequence of events will continue as long as planes present themselves at the ten mile range until all the units of the system, except one, are following planes. The maximum capacity of the system is ten planes being followed simultaneously at intervals of one mile.

As soon as one of the planes reaches the touch down point, the cam 171, associated with the range responsive circuit of the unit which is following it, will have rotated to the point at which the cam follower 170 rides down into the recessed portion of the cammed surface, thus opening the switches 166 and 169 and conditioning the range responsive circuit for actuation by the phase difference between the currents $\phi_{13}$ and $\phi_{14}$. If the range indication of this unit is more than one mile from that of the next preceding unit of the chain, the servo motor 32 will be operated until that indication has been reduced to one mile. When this occurs, the phase difference between currents $\phi_{13}$ and $\phi_{14}$ will have been reduced to zero and the servo motor 32 will stop. This insures that one of the units will be maintained in readiness at all times to accept a plane presenting itself at the ten mile range in the area scanned.

The transmitter 131 shown in Fig. 7A may be used both for the purpose of communicating with the aircraft to be followed and controlled and to provide a means for communicating to the plane information for the operation of range, azimuth and elevation indicators in the plane or for utilization for automatic control for the flight in the plane. Each of the eleven units of the system will be provided with a separate transmitter, each tuned to a respective carrier frequency which the plane is equipped to receive. There will be provided to the transmitter voltages from the range responsive circuit of phases $\phi_1$, $\phi_2$, $\phi_3$, $\phi_{13}$ and $\phi_{14}$. There will also be supplied, from the azimuth and elevation circuits 174 and 175 associated with the range responsive circuit, voltages of phase $\phi_9$ and $\phi_{11}$. The transmitter 131 may operate in any known manner to convey the information which resides in the phase excursions of the various input currents of phase $\phi_1$, $\phi_2$, $\phi_3$, etc. For example, each input current may be utilized to impress its phase excursions upon a wave of a respective selected frequency which is utilized to modulate the carrier.

The mechanism provided in the plane for the reception and utilization of this information is illustrated in Fig. 7C. There is provided a receiver 180 which may be of conventional type, from which are taken separately through frequency selective filters the output corresponding to the phase modulated voltage of each frequency transmitted by transmitter 131 of Fig. 7A. These outputs may all be applied to conventional pitch, yaw and speed control circuits of the auto pilot type which are indicated by the box 181.

There are shown mounted in a panel, represented by the box 182, separate indicators with the various types of information available from the transmitted signals. Indicator 183 gives an indication of the range to the plane ahead. Indicator 184 shows the plane's deviation in azimuth in the desired glide path. Indicator 185 shows the plane's deviation in elevation from the desired glide path. Indicator 186 provides the range to touch down.

Indication of the range to the plane ahead is derived by a comparison of the phase of the signals of phase $\phi_{13}$ and $\phi_{14}$. The voltage of phase $\phi_{14}$ is applied to a phase splitter 186 which provides voltages for the stator windings of a synchro resolver 187, the rotor of which is positioned by a servo motor 188. Voltage of phase $\phi_{13}$ is applied to the center-tap of the secondary of a transformer 189 to the primary of which is applied the output of resolver 187. Voltage from the transformer 189 is applied to phase rectifier 190, the output of which is applied to the control of servo motor 188 which drives indicator 183.

The azimuth deviation indication is derived from a phase comparison of signals of phase $\phi_2$ and of phase $\phi_9$, the latter having been initially derived from the output of a synchro resolver 47 in an azimuth responsive circuit such as illustrated in Fig. 6. Voltage of phase $\phi_9$ is applied to a phase splitter 191 the output of which is applied to the stator windings of a synchro resolver 192. The rotor of this resolver is driven by a servo motor 193 and its output is applied to the primary of a transformer 194. Voltage of phase $\phi_2$ is applied to the center-tap of the secondary of this transformer, and its output is applied to a phase rectifier and amplifier 195 which supplies current for the control of servo motor 193 driving azimuth deviation indicator 184.

The elevation deviation indication is derived from a phase comparison of signals from phase $\phi_2$ and $\phi_{11}$, the latter having been derived from the output of a synchro resolver 67 in an elevation responsive circuit such as illustrated in Fig. 6. The voltage of $\phi_{11}$ is applied to a phase splitter 197, the output of which is applied by the stator windings of a synchro resolver 198. The rotor of this resolver is driven by servo motor 199 and its output is applied to the primary of a transformer 200. Voltage of phase $\phi_2$ is applied to a center-tap of the secondary of the transformer 200 and the output of the transformer is applied to a phase rectifier and amplifier 201 which provides voltage for the control of servo motor 199. This motor drives the elevation deviation indicator 185.

The indication of touch down range is derived from a comparison of signals having phase $\phi_1$ and $\phi_3$. Voltage of phase $\phi_1$ is applied to a phase splitter 202, the output of which is supplied to the stator windings of a synchro resolver 203. The rotor of this resolver is driven by a servo motor 204 and its output is applied to the primary of a transformer 205. Voltage of phase $\phi_3$ is applied to the center-tap of the secondary of this transformer and its output is supplied to a phase rectifier and amplifier 206. Control voltage for the servo motor 24 is provided by rectifier 206. This servo motor drives the touch down range indicator 196.

In the ground controlled landing of aircraft, it is necessary to maintain radio communication with the planes being landed prior to the assumption of control by the system. It is also desirable to maintain, at all times, the possibility of reestablishing control by verbal means even when an automatic system is in use. This can be accomplished in the system which has been described by the utilization of the transmitter 131 for verbal communication purposes, as well as for the transmission of the control signals. In the system providing for the simultaneous control of a number of aircraft from a single ground station problems of cross-talk and interference arise by virtue of the close location of a number of the transmitters 131.

There is shown in Fig. 8 an arrangement permitting verbal communication with aircraft prior to and during the control of their descent by means of the system and illustrating an arrangement for eliminating cross-talk and interference between the various transmitters required. There is shown in the lower part of this figure the indicators 154 to 164 of Fig. 7B, together with the transmitters 131 and the range, azimuth and elevation indicating circuits associated therewith. The range, azimuth and elevation indicating circuits associated with indicator 154 have been indicated by a block numbered 216. The transmitter associated with this indicator is numbered 131 as in Fig. 7A. The transmitters and indicator circuits associated with the other indicators are not numbered. It is to be understood that statements made with respect to the circuits associated with indicator 154 apply likewise to the circuits associated with the other indicators. For verbal communication purposes there are also provided, in the ground station, a separate receiver for each of the transmitters 131. These receivers are indicated in the upper part of the figure, the one associated with the circuits connected to indicator 154 being numbered 210. The remaining receivers are not numbered. Each receiver is provided with an ear piece or head phone 212. Each transmitter is provided with a microphone 211. Each transmitter is provided with a pair of single pole, single throw switches 217 and 218 in the circuits leading to the microphone and the range, azimuth and elevation circuits 216. These switches may be ganged as shown so that each is open when the other is closed.

In order to prevent cross-talk and interference between the various transmitters, when in simultaneous operation, a time sharing circuit as indicated by block 213 may be provided. Associated with this circuit are a receiving antenna 215 and a transmitting antenna 214.

The time sharing circuits may be circuits such as those disclosed in application Serial No. 150,284, entitled "Multi-Channel Radio Communication System," filed March 17, 1950, by William G. Alexander and Charles McL. Harden, now Patent No. 2,652,453, dated September 15, 1953. These circuits provide for the sequential activation of each transmitter and its associated receiver at a rate higher than the frequency of the highest audio signal translated by the system.

In an alternative form of the invention illustrated in Fig. 9 the coupler and phase splitting circuits of Fig. 7B may be dispensed with. Control voltage for each of the range determining circuits which are not tracking planes may be derived from a comparison of $\phi_3$ voltage of the range determining circuit being conrolled and the $\phi_3$ voltage of the next preceding range determining circuit of the chain, the latter voltage being transformed into a $\phi_{13}$ voltage by the use of the phase shifter 167 which operates just as it did in Fig. 7A.

In the upper part of Fig. 9 there is shown a portion of a range determining circuit of the type illustrated in Fig. 7A. The 4,000 ~ oscillator 21 is shown with its output applied by way of switch 166 to one-half of the primary of transformer 100. The phase splitter 23, synchro resolver 24 and phase splitter 28 are shown. The output of synchro resolver 24 feeds directly to phase splitter 28, the switch 169 of Fig. 7A not being present.

The servo motor 32 drives range indicator 154 and cam 171 which operates in the same manner as in Fig. 7A but now only actuates switch 166. The remainder of the range responsive circuit is the same as in Fig. 7A.

Directly beneath this circuit is shown the phase splitter 23, synchro resolver 24, phase splitter 28 and servo motor 32 of the range determining circuit associated with range indicator 155. Similar components of the range determining circuit associated with range indicator 164 are shown. The remainder of the range determining circuits are not shown, their presence being indicated by broken lines joining the range determining circuits associated with indicators 155 and 164.

The $\phi_3$ output of the synchro resolver 24 associated with indicator 155 is applied by conductor 173 to phase shifter 167. The output of this shifter which has phase $\phi_{13}$ is applied both to the transmitter 131 and terminal 165 of switch 166.

The $\phi_3$ output of the resolver 24 associated with indicator 154 is applied through a conductor 173 and phase shifter 167 to the transmitter 131 associated with indicator 164.

Although not all range indicator circuits are shown, the same relationships exist down through the chain. The $\phi_3$ output of each range determining circuit is applied through a phase shifter 167 to the transmitter 131 associated with the next succeeding range determining circuit of the chain. The phase shifters 167 operate as in Fig. 7A, reducing the phase difference between voltage $\phi_{13}$ and $\phi_3$ to zero when the range indication of succeeding indicators differ by the minimum range spacing desired between aircraft being guided in for a landing. If a twenty mile scale covers 360° of an indicator dial, the phase shifter will apply a phase shift of 18° for a chain of eleven range determining circuits where a maximum of ten may handle aircraft simultaneously. In the arrangement of Fig. 9, voltages of phases $\phi_{13}$ and $\phi_3$ will be compared in the aircraft for a determination of the interval between planes under control.

What is claimed is:

1. Means for determining and indicating the range of a target; said means comprising a radio echo device, a pair of current generating devices each responsive to current applied thereto to generate an alternating current output having a phase governed by the phase of the applied current, means applying the video response of said radio echo device to the first of said generating devices, means applying the transmitted signal of said radio echo device to the second of said generating devices, means to compare the phase of the outputs of said generating devices, a servo motor driven by the resultant of said comparison, means driven by said servo motor to vary the phase of the output of said second generating device in a direction to reduce the difference in the phase of said outputs, gating means governing the admittance of the video response of said radio echo device to the first of said generating devices, means varying the time of the gating action of said gating means as a function of the output of said second generating device, range indicating means, means driving said range indicating means in accordance with the phase of the output of said second generating device.

2. Means for determining and indicating the range of a target as set forth in claim 1, said means comprising a third current generating device generating an alternating current having a phase governed by the phase of current applied thereto, means applying the output of said second current generating device to said third generating device, means comparing the phase of the outputs of said first and second current generating device, a second servo motor driven by the resultant of the last mentioned phase comparison, means driven by said second servo motor to vary the phase of the output of said third generating device, means combining the outputs of said first and third current generating device and comparing the phase of said combined outputs with the phase of the output of said second current generating device and means responsive to the last mentioned phase comparison for driving said first servo motor.

3. Means for determining and indicating the range of a target as set forth in claim 1, said means including; a translating circuit between the first of said generating devices and said phase comparing means, said translating circuit being selectively responsive to voltages having the same rate of change of phase as said video response from said aircraft.

4. Means for determining and indicating the range of a target; said means comprising a radio echo device, a first current generating device responsive to the video response of said radio echo device to generate an alternating current having a phase governed by said video response, a second current generating device responsive to the transmitted signal of said radio echo device to generate alternating current having a phase governed by said transmitted signal, an element forming part of said second current generating device and movable to vary the phase of the current generated thereby, means comparing the phase of the currents generated by said generating devices, a servo motor driven by the resultant of said comparison, means connecting said element to said servo motor for movement thereby in a direction to reduce the phase difference of the outputs of said generating devices, a gating means controlling the admittance of the video response of said radio echo device to said first generating device, means generating gating pulses for rendering said gating means conductive, means connecting the output of said second generating device to said gating pulse generating means to control the time of occurrence of said gating pulses, and a range indicating means positioned by said element.

5. Means for determining and indicating the range of a target as set forth in claim 4, said means including; a translating circuit between the first of said generating devices and said phase comparing means, said translating circuit being selectively responsive to voltages having the same rate of change of phase as said video response from said aircraft.

6. Means for determining and indicating the range of a target; said means comprising a radio echo device, means for deriving a first voltage the phase of which is a function of the phase of the video response of said radio echo device from said target, means for deriving a second voltage the phase of which is a function of the phase difference between said video response and the signal transmitted by said radio echo device, means deriving a third voltage the phase of which is a function of an integral of said second voltage, means combining said first and third voltages, means comparing the phase of said combined voltages with the phase of said second voltage, a servo motor driven by the resultant of said phase comparison and an indicator means positioned by said servo motor to indicate the range of said target from said device.

7. Means for determining and indicating the range of a target as set forth in claim 6, said means comprising gating means governing the admittance of the video response of said radio echo device to said means for deriving said first voltage and means varying the time of the gating action of said gating means as a function of the phase of said second voltage.

8. Means for determining and indicating the range of a target as set forth in claim 6, said means comprising; a translating circuit selectively responsive to voltages having the same rate of change of phase as said video response, said translating circuit being interposed between said means deriving said first voltage and said means deriving said second and third voltages.

9. A system for guiding aircraft to a landing comprising a radio echo device scanning in azimuth through a horizontal sector including a predetermined glide path and scanning in elevation through a vertical sector including said glide path, means for deriving a first voltage the phase of which is a function of the phase of the video response of said radio echo device from an aircraft in said scanned sectors, means for deriving a second voltage the phase of which is a function of the phase difference between said video response and the signal transmitted by said radio echo device, means deriving a third voltage the phase of which is a function of an integral of said second voltage, means combining said first and third voltages, means comparing the phase of said combined voltages with the phase of said second voltage, a first servo motor driven by the resultant of said phase comparison, an indicator means positioned by said first servo motor to indicate the range of said target from said device, means comparing the phase of said first voltage with the phase of the horizontal scanning movement of said device, a second servo motor, means applying the resultant of the last mentioned phase comparison to said second servo motor as control voltage and an azimuth indicator driven by said second servo motor to indicate the azimuth of said aircraft with respect to said glide path.

10. A system for guiding aircraft to a landing as set forth in claim 9, said system comprising; a translating circuit selectively responsive to voltages having the same rate of change of phase as said video response, said translating circuit being interposed between said means for deriving said first voltage and the means for deriving said second and third voltages.

11. A system for guiding aircraft to a landing comprising a radio echo device scanning in azimuth through a horizontal sector including a predetermined glide path and scanning in elevation through a vertical sector including said glide path, means for deriving a first voltage the phase of which is a function of the phase of the video response of said radio echo device from an aircraft in said scanned sectors, means for deriving a second voltage the phase of which is a function of the phase difference between said video response and the signal transmitted by said radio echo device, means deriving a third voltage the phase of which is a function of an integral of said second voltage, means combining said first and third voltages, means comparing the phase of said combined voltages with the phase of said second voltage, a first servo motor driven by the resultant of said phase comparison, an indicator means positioned by said first servo motor to indicate the range of said target from said device, means comparing the phase of said first voltage with the phase of the vertical scanning movement of said device, a second servo motor driven by the resultant of the last mentioned phase comparison and an elevation indicator driven by said second servo motor to indicate the elevation of said aircraft with respect to said glide path.

12. A system for guiding aircraft to a landing as set forth in claim 11, said system comprising; a translating circuit selectively responsive to voltages having the same rate of change of phase as said video response, said translating circuit being interposed between said means for deriving said first voltage and the means for deriving said second and third voltages.

13. A system for guiding aircraft to a landing comprising a radio echo device scanning in azimuth through a horizontal sector including a predetermined glide path and scanning in elevation through a vertical sector including said glide path, means for deriving a first voltage the phase of which is a function of the phase of the video response of said radio echo device from an aircraft in said scanned sectors, means for deriving a second voltage the phase of which is a function of the phase difference between said video response and the signal transmitted by said radio echo device, means deriving a third voltage the phase of which is a function of an integral of said second voltage, means combining said first and third voltages, means comparing the phase of said combined voltages with the phase of said second voltage, means combining said first and third voltages, means comparing the phase of said combined voltages with the phase of said second voltage, a first servo motor driven by the resultant of said phase comparison, an indicator means positioned by said first servo motor to indicate the range of said target from said device, means comparing the phase of said first voltage with the phase of the horizontal scanning movement of said device, a second servo motor, means applying the resultant of the last mentioned phase comparison to said second servo motor as control voltage, an azimuth indicator driven by said second servo motor to indicate the azimuth of said aircraft with respect to said glide path, means comparing the phase of said first voltage with the phase of the vertical scanning movement of said device, a third servo motor driven by the resultant of the last mentioned phase comparison and an elevation indicator driven by said third servomotor to indicate the elevation of said aircraft with respect to said glide path.

14. A system for guiding aircraft to a landing as set forth in claim 13, said azimuth and said elevation indicators comprising a single element bearing an azimuth indication and an elevation indication, a dial bearing a reference indication indicative of an azimuth coinciding with said glide path and a reference indication of an elevation coinciding with said glide path, said element being driven by said second servo motor in a direction to position said azimuth indication with respect to said reference indication of azimuth and being driven by said third servo motor to position said elevation indication with respect to said reference indication of elevation.

15. A signal translating circuit having a translating characteristic which is selective with respect to a desired signal; said circuit comprising an electric discharge device having an input circuit, means applying said signal to said input circuit, means comparing the phase of said signal voltage with that of a voltage of reference phase, means rectifying the voltage resulting from said phase comparison, said rectifying means including a load impedance, an energy storage means connected across said load impedance, and a second rectifying means connected between said energy storage means and said input circuit in a manner to afford a connection between said energy storage means and said input circuit for negative potentials only.

16. A signal translating circuit having a translating characteristic which is selective with respective to the rate of change of phase of an applied signal; said circuit comprising an electric discharge device having an input circuit, means applying signal voltage to said input circuit, means comparing the phase of said signal voltage with that of a voltage of reference phase, an energy storage element, means responsive to the magnitude of the resultant of said phase comparison to vary the level and polarity of energy stored in said storage device, and a unilateral impedance coupling said energy storage element to said input circuit, said impedance being connected in a sense to apply only energy of negative polarity to said input circuit.

17. A signal translating circuit having a translating characteristic which is selective with respect to the rate of change of phase of an applied signal; said circuit comprising an electric discharge device having an input circuit, means applying signal voltage to said input circuit, means comparing the phase of said signal voltage with that of a voltage of reference phase, means generating a D. C. voltage of negative polarity, the magnitude of which is a function of the rate of change of the phase difference between said voltage of reference phase and said signal voltage, and means applying said D. C. voltage to said input circuit as biasing voltage.

18. A signal translating circuit having a translating characteristic which is selective with respect to the rate of change of phase of an applied signal; said circuit comprising an electric discharge device having a pair of control electrodes, means applying signal voltage to one of said control electrodes, means comparing the phase of said signal voltage to that of a voltage of reference phase, means generating a D. C. voltage of negative polarity the magnitude of which is a function of rate of change of the phase difference between said signal voltage and said voltage of reference phase and means applying said D. C. voltage as biasing voltage to the other of said control electrodes.

19. A signal translating circuit having a translating characteristic which is selective with respect to the rate of change of phase of an applied signal; said circuit comprising an electric discharge device having a pair of control electrodes, means applying signal voltage to one of said control electrodes, a source of voltage of the same frequency as said signal voltage, means combining voltage from said source with said signal voltage, means responsive to a decrease in the magnitude of said combined voltages to generate a negative voltage output and means coupling the output of the last named means to the other of said control grids as biasing voltage.

20. A system for guiding aircraft to a landing comprising a radio echo device scanning in azimuth through a horizontal sector including a predetermined glide path and scanning in elevation through a vertical sector including said glide path, means responsive to the video signal of said radio echo device to generate an indication of the range of an aircraft in said scanned sectors, means generating a reference voltage having a phase which varies as a function of the rate of change of range of said aircraft, and means translating said signal between said radio echo device and said indication generating means, said translating means being selective with respect to said rate of change of range, said translating means comprising an electric discharge device having an input circuit, means applying said signal to said input circuit, means comparing the phase of said signal with that of said reference voltage, an energy storage element, means responsive to the magnitude of the resultant of said phase comparison to vary the level and polarity of energy stored in said storage device and a unilateral impedance coupling said energy storage element to said input circuit, said impedance being connected in a sense to apply only energy of negative polarity to said input circuit.

21. A system for guiding aircraft to a landing comprising a radio echo device scanning in azimuth through a horizontal sector including a predetermined glide path and scanning in elevation through a vertical sector including said glide path, means responsive to the video signal of said radio echo device to generate an indication of the range of an aircraft in said scanned sectors, means generating a reference voltage having a phase which varies as a function of the rate of change of range of said aircraft and means translating said signal between said radio echo device and said indication generating means, said translating means being selective with respect to said rate of change of range, means applying said signal to said input circuit, said translating means comprising an electric discharge device having an input circuit, means comparing the phase of said signal voltage with that of said reference voltage, means rectifying the voltage resulting from said phase comparison, said rectifying means including a load impedance, an energy storage means connected across said load impedance and a second rectifying means connected between said energy storage means and said input circuit in a manner to afford a connection between said energy storage means and said input circuit for negative potentials only.

22. A system for guiding aircraft to a landing comprising a radio echo device scanning in azimuth through a horizontal sector including a predetermined glide path and scanning in elevation through a vertical sector including said glide path, means responsive to the video signal of said radio echo device to generate an indication of the range of an aircraft in said scanned sectors, means generating a reference voltage having a phase which varies as a function of the rate of change of range of said aircraft, and means translating said signal between said radio echo device and said indication generating means, said translating means being selective with respect to said rate of change of range, said translating means comprising an electric discharge device having an input circuit, means applying said signal to said input circuit, means comparing the phase of said signal with that of said reference voltage, means generating a D. C. voltage of negative polarity, the magnitude of which is a function of the rate of change of the phase difference between said reference voltage and said signal, and means applying said D. C. voltage to said input circuit as bias voltage.

23. A system for guiding aircraft to a landing comprising a radio echo device scanning in azimuth through a horizontal sector including a predetermined glide path and scanning in elevation through a vertical sector including said glide path, means responsive to the video signal of said radio echo device to generate an indication of the range of an aircraft in said scanned sectors, means generating a reference voltage having a phase which varies as a function of the rate of change of range of said aircraft, and means translating said signal between said radio echo device and said indication generating means, said translating means being selective with respect to said rate of change of range, said translating means comprising an electric discharge device having a pair of control electrodes, means applying said signal to one of said control electrodes, means comparing the phase of said signal to that of said reference voltage, means generating a D. C. voltage of negative polarity, the magnitude of which is a function of the rate of change of the phase difference between said signal and said reference voltage, and means applying said D. C. voltage as biasing voltage to the other of said control electrodes.

24. A system for guiding aircraft to a landing comprising a radio echo device scanning in azimuth through a horizontal sector including a predetermined glide path and scanning in elevation through a vertical sector including said glide path, means responsive to the video signal of said radio echo device to generate an indication of the range of an aircraft in said scanned sectors, means generating a reference voltage having a phase which varies as a function of the rate of change of range of said aircraft, and means translating said signal between said radio echo device and said indication generating means, said translating means being selective with respect to said rate of change of range, said translating means comprising an electric discharge device having a pair of control electrodes, means applying said signal to one of said control electrodes, means combining said signal and said reference voltage, means responsive to a decrease in the magnitude of said combined voltages to generate a negative voltage output and means coupling the output of the last named means to the other of said control grids as biasing voltage.

25. A system for simultaneously guiding a plurality of aircraft to a landing comprising a radio echo device scanning in azimuth through a horizontal sector including a predetermined glide path and scanning in elevation through a vertical sector including said glide path, range, azimuth and elevation determining circuits associated with each of said devices, each of said range determining circuits comprising means comparing the phase of the video response of said radio echo device from an aircraft in said scanned sectors with the phase of the transmitted signal of said device, means constituting a first servo loop driven by the resultant of said comparison and a range indicator driven by said servo loop to indicate the range of said aircraft from said device, each of said azimuth determining circuits comprising means comparing the phase of said video response with the phase of the horizontal scanning movement of said device, means constituting a second servo loop driven by the resultant of the last named phase comparison and an azimuth indicator driven by said second servo loop to indicate the azimuth of said aircraft with respect to said glide path, each of said elevation determining circuits comprising means comparing the phase of said video response with the phase of the vertical scanning movement of said device, means constituting a third servo loop driven by the resultant of the last named phase comparison, and an elevation indicator driven by said third servo loop to indicate the elevation of said aircraft with respect to said glide path, a plurality of phase regulating devices, each including an element driven by a respective one of said range determining circuits, in synchronism with the range indicator driven thereby, to vary the phase of a voltage applied to said phase regulating device as a function of the range determined by said circuit, means connecting said phase regulating devices in a chain with the output of each of said devices except the last applied to the next succeeding device of said chain, means applying a reference voltage to the first of said phase regulating devices, a plurality of switching means each connected to a respective one of said range determining circuits, each of said switching means having two operative positions, in the first of which said range determining circuit is connected to said radio echo device and has impressed on it the video response and transmitted signal thereof and in the second of which said range determining circuit is disconnected from said radio echo device and has impressed on it, in lieu of said video response and said transmitted signal, the output of the one of said phase regulating circuits driven by it and the output of the next succeeding phase regulating circuit of said chain, each of said switching means being actuated to said first operative position when the range indicator connected thereto indicates a first predetermined range at which it is desired to begin the guiding of an aircraft and being actuated to said second operative position when the range indicator connected thereto indicates a second predetermined range at which it is desired to cease the guiding of said aircraft and means shifting the relative phase of the output of said phase regulating circuits connected to said range determining circuit by an amount such that said relative phase is reduced to zero when the indicators connected to said phase regulating circuits indicate ranges which differ by an amount which will maintain an equal spacing between aircraft being guided by said system when each of said range determining circuits except one is following a separate aircraft.

26. A system as set forth in claim 25, said system being characterized in that each of said range determining circuits includes a translating circuit applying said video response from said aircraft to the said phase comparison means thereof, said translating circuit being selectively responsive to voltages having the same rate of change of phase as said video response.

27. A system for simultaneously guiding a plurality of aircraft to a landing along a selected glide path; said system comprising a radio echo device scanning in azimuth through a horizontal sector including said glide path and scanning in elevation through a vertical sector including said glide path, a plurality of range determining circuits, each associated with said radio echo device, each of said range determining circuits comprising means comparing the phase of the video response of said radio echo device from an aircraft in said scanned sectors with the phase of the transmitted signal of said device, a range indicator and means actuated by said phase comparison means to drive said indicator, a plurality of phase regulating devices, each including an element driven by a respective one of said range determining circuits in synchronism with the range indicator driven thereby to vary the phase of a voltage applied to said phase regulating device as a function of the range determined by said circuit, means connecting said phase regulating devices in a chain with the output of each of said devices except the last applied to the next succeeding device of said chain, means applying a reference voltage to the first of said devices, a plurality of switching means each connected to a respective one of said range determining circuits, each of said switching means having two operative positions, in the first of which said range determining circuit is connected to said radio echo device and has impressed on it the video response and transmitted signal thereof and in the second of which said range determining circuit is disconnected from its associated radio echo and has impressed on it, in lieu of said video response and said transmitted signal, the output of the one of said phase regulating circuits driven by it and the output of the next succeeding phase regulating circuit of said chain, each of said switching means being actuated to said first operative position when the range indicator connected thereto indicates a first predetermined range at which it is desired to begin the guiding of an aircraft and being actuated to said second operative position when the range indicator connected thereto indicates a second predetermined range at which it is desired to cease the guiding of said aircraft and means shifting the relative phase of the output of said phase regulating circuits connected to said range determining circuit by an amount such that said relative phase is reduced to zero when the indicators connected to said phase regulating circuits indicate ranges which differ by an amount which will maintain an equal spacing between aircraft being guided by said system when each of said range determining circuits except one is following a separate aircraft.

28. Means for simultaneously guiding a plurality of aircraft to a landing along a selected glide path; said system comprising a radio echo device scanning an area including said glide path, a range determining circuit connected to said radio echo device and responsive to the phase relationship between the video response of said radio echo device from an aircraft in said scanned area and the transmitted signal of said device to continuously determine the range of said aircraft, a range indicator connected to each of said range determining circuits and driven thereby to indicate the range of said aircraft, a chain of phase regulating devices, each except the last having its output connected to the input of the next succeeding device, means applying a reference voltage to the input of the first of said devices, an element in each of said phase regulating devices driven by a respective one of said range determining circuits in synchronism with the range indicator driven thereby to alter the phase of the voltage applied to the input of said device, means applying to each of said range determining circuits, in lieu of said video response and transmitted signal, the output of the one of said phase regulating devices driven thereby and the output of the next succeeding device in said chain, said applying means including means shifting the relative phase of said outputs by an amount such that a zero phase difference exists when the indicators of said range determining circuit and the range determining circuit driving said next succeeding device indicate a preselected minimum range spacing between said aircraft, and means rendering said applying means inoperative when the range indicator of the range determining circuit connected thereto indicates a range lying within predetermined limits.

29. Means for simultaneously guiding a plurality of aircraft to a landing along a selected glide path comprising a plurality of means for continuously determining the range of an aircraft adjacent said glide path, respective means driven by said range determining means for indicating the range determined thereby, means connecting said range determining means into a chain, said connecting means comparing the range determination of each of said range determining means with that of the next succeeding range determining means of said chain and deriving from said comparison a control voltage of such character as to cause said range determining means to drive its associated range indicator to an indication which differs from that of the indicator of the next succeeding range determining circuit of said chain by a predetermined amount, means applying said control voltage to said range determining means and means disabling said applying means while the range indicator associated therewith indicates a range lying within predetermined limits.

30. A system for simultaneously determining the range of a plurality of aircraft adjacent a selected glide path; said system comprising a radio echo device scanning an area containing said glide path, a plurality of range determining means each responsive to the video response of said radio echo device from an aircraft in the area scanned and the signal transmitted by said device to continuously determine the range of said aircraft, gating means comparing said video response with the output of said range determining means and rejecting any video response not conforming thereto in phase and rate of change of phase, said gating means controlling the application of video response voltage to said range determining means, means connecting said range determining means into a chain, said connecting means being responsive to a difference in ranges determined by successive range determining means in said chain when said difference exceeds a predetermined minimum, to drive the first of said successive means toward a reduction of said difference in ranges, and means disabling said connecting means with respect to said first range determining means when the range determined thereby lies within predetermined limits, between which it is desired to determine the range of an aircraft.

31. A system for simultaneously determining the range of a plurality of aircraft adjacent a selected glide path; said system comprising a radio echo device scanning an area containing said glide path, a plurality of range determining means each responsive to the video response voltage of said radio echo device from an aircraft in the area scanned and the signal transmitted by said device to continuously determine the range of said aircraft, means connecting said range determining means into a chain, said connecting means being responsive to a difference in ranges determined by successive range determining means in said chain when said difference exceeds a predetermined minimum to drive the first of said successive means toward a reduction of said difference in ranges and means disabling said connecting means with respect to said first range determining means when the range determined thereby lies within predetermined limits between which it is desired to determine the range of an aircraft.

32. A system as set forth in claim 31, said system comprising a radio transmitter associated with each of said range determining means, means applying to said transmitter as modulating voltage the signal transmitted by said device, the output of said range determining means and the outputs of said connecting means which are applied to said range determining means, a radio receiver in said aircraft for receiving the signal transmitted by said transmitter, means demodulating the signal received by said receiver, means in said aircraft for indicating the range thereof as determined by said range determining means and the range between said aircraft and the next preceding aircraft being guided by said system along said glide path, means comparing the phase of the signal transmitted by said radio echo device and the output of said range determining means and deriving from said comparison a control voltage, means utilizing said control voltage to drive said means for indicating the range of said aircraft, means comparing the phase of the outputs of said connecting means and deriving from the last named comparison a control voltage and means utilizing the last named control voltage to drive said means indicating the range between said aircraft and said next preceding aircraft.

33. A system for simultaneously determining the range, azimuth and elevation of a plurality of aircraft adjacent a selected glide path; said system comprising a radio echo device scanning an area containing said glide path, a plurality of range determining means each responsive to the video response of said radio echo device from an aircraft in the area scanned and the signal transmitted by said device to continuously determine the range of said aircraft, an azimuth determining means connected to each of said range determining means, said azimuth determining means comprising means comparing the phase of said video response with the phase of the horizontal scanning movement of said device and deriving from said comparison the azimuth of said aircraft, an elevation determining means connected to each of said range determining means, said elevation determining means comparing the phase of said video response with the phase of the vertical scanning movement of said device and deriving from said comparison the elevation of said aircraft, gating means comparing said video response with the output of said range determining means and rejecting any video response not substantially conforming thereto in phase and rate of change of phase, said gating means controlling the application of video response voltage to said range, azimuth and elevation determining means, means connecting said range determining means into a chain, said connecting means being responsive to a difference in ranges determined by successive range determining means in said chain when said difference exceeds a predetermined minimum, to drive the first of said successive means toward a reduction of said difference in ranges, and means disabling said connecting means with respect to said first range determining means when the range determined thereby lies within predetermined limits, between which it is desired to determine the range of an aircraft.

34. A system for simultaneously determining the range, azimuth and elevation of a plurality of aircraft adjacent a selected glide path; said system comprising a radio echo device scanning an area containing said glide path, a plurality of range determining means each responsive to the video response voltage of said radio echo device from an aircraft in the area scanned and the signal transmitted by said device to continuously determine the range of said aircraft, an azimuth determining means connected to each of said range determining means, said azimuth determining means comparing the phase of said video response voltage with that of the horizontal scanning movement of said device and deterinining from said comparison the azimuth of said aircraft, an elevation determining means connected to each of said range determining means, said elevation determining means comparing the phase of said video response voltage with that of the vertical scanning movement of said device, means connecting said range determining means into a chain, said connecting means being responsive to a difference in ranges determined by successive range determining means in said chain when said difference exceeds a predetermined minimum to drive the first of said successive means toward a reduction of said difference in ranges and means disabling said connecting means with respect to said first range determining means when the range determined thereby lies within predetermined limits between which it is desired to determine the range of an aircraft.

35. A system as set forth in claim 34, said system comprising a radio transmitter associated with each of said range determining means, means applying to said transmitter as modulating voltage, a voltage having a phase determined by the video response of said radio echo device, the signal transmitted by said device, the output of said range determining means, the outputs of the azimuth and elevation determining means connected to said range determining means and the outputs of said connecting means which are applied to said range determining means, a radio receiver in said aircraft for receiving the signal transmitted by said transmitter, means demodulating the signal received by said receiver, means in said aircraft for indicating the range thereof as determined by said range determining means, the azimuth thereof with respect to said glide path as determined by said azimuth determining means, the elevation thereof with respect to said glide path as determined by said elevation determining means and the range between said aircraft and the next preceding aircraft being guided by said system along said glide path, means comparing the phase of the signal transmitted by said radio echo device and the output of said range determining means and deriving from said comparison a control voltage, means utilizing said control voltage to drive said means for indicating the range of said aircraft, means comparing the phase of said voltage having its phase determined by the video response of said radio echo device and the output of said azimuth determining means, means deriving from the last named comparison a control voltage, means utilizing the last named control voltage to drive said azimuth indicating means, means comparing the phase of the voltage having its phase determined by the video response of said radio echo device and the output of said elevation determining means and deriving from the last named comparison a control voltage, means utilizing the last named control voltage to drive said elevation indicating means, means comparing the phase of the outputs of said connecting means and deriving from the last named comparison a control voltage and means utilizing the last named control voltage to drive said means indicating the range between said aircraft and said next preceding aircraft.

36. A system for guiding aircraft to a landing comprising a radio pulse echo device scanning in azimuth through a horizontal sector including a predetermined glide path and scanning in elevation through a vertical sector including said glide path, the scanning movements of said device in azimuth and elevation being independent, means deriving a first signal, the phase of which is synchronized with the pulse repetition frequency of the transmitted signal of said pulse echo device, a range indicator, means deriving a second signal, the frequency and phase of which are functions of the video response of said pulse echo device from an aircraft in said scanned sectors, means deriving a third signal, the frequency of which is the same as that of said first signal and the phase of which is a function of the position of the said range indicator, means comparing said second and third signals and producing a fourth signal, the frequency of which is the same as that of said second and third signals and the phase of which is a function of the integration with respect to time of the phase difference of said second and third signals, means comparing the phase of said second and third signals and combining the difference thereof with said fourth signal, a servo motor driving said range indicator, and means applying said combined signal as exciting voltage to said servo motor.

37. A system as set forth in claim 36, said system including means comparing the phase of said second signal with the phase of the horizontal scanning movement of said device and deriving a signal which is a function of the difference of said phases, a second servo motor, an azimuth indicator driven by said second servo motor and means applying the last named signal as exciting voltage to said second servo motor.

38. A system as set forth in claim 36, said system including means comparing the phase of said second signal with the phase of the vertical scanning movement of said device and deriving a signal which is a function of the difference of said phases, a second servo motor, an elevation indicator driven by said second servo motor and means applying the last named signal as exciting voltage to said second servo motor.

39. A system for guiding aircraft to a landing comprising a radio echo device scanning in azimuth through a horizontal sector including a predetermined glide path and scanning in elevation through a vertical sector including said glide path, the scanning movements of said device in azimuth and elevation being independent, means comparing the phase of the video response of said device from an aircraft in said scanned sectors with the phase of the transmitted signal of said device, means constituting a first servo loop driven by the resultant of said comparison, a range indicator driven by said servo loop to indicate the range of said aircraft from said device, means comparing the phase of said video response with the phase of the horizontal scanning movement of said device, means constituting a second servo loop driven by the resultant of the last named phase comparison, an azimuth indicator driven by said second servo loop to indicate the azimuth of said aircraft with respect to said glide path, means comparing the phase of said video response with the phase of the vertical scanning movement of said device, means constituting a third servo loop driven by the resultant of the last named phase comparison and an elevation indicator driven by said third servo loop to indicate the elevation of said aircraft with respect to said glide path, said azimuth and said elevation indicators comprising a single element bearing an azimuth indication and an elevation indication, a dial bearing a reference indication indicative of an azimuth coinciding with said glide path and a reference indication indicative of an elevation coinciding with said glide path, said element being driven by said second servo loop in a direction to position said azimuth indication with respect to said reference indication of azimuth and said element being driven by said third servo loop in a direction to position said elevation indication with respect to said reference indication of elevation.

40. A system for guiding aircraft to a landing comprising a radio echo device scanning in azimuth through a horizontal sector including a predetermined glide path and scanning in elevation through a vertical sector including said glide path, the scanning movement of said device in azimuth and elevation being independent, means comparing the phase of the video response of said device from an aircraft in said scanned sectors with the phase of the transmitted signal of said device, means constituting a first servo loop driven by the resultant of said comparison, a range indicator driven by said servo loop to indicate the range of said aircraft from said device, means comparing the phase of said video response with the phase of the horizontal scanning movement of said device, means constituting a second servo loop driven by the resultant of the last named phase comparison, an azimuth indicator driven by said second servo loop to indicate the azimuth of said aircraft with respect to said glide path, and a translating circuit applying said video response from said aircraft to said phase comparison means, said translating circuit being selectively responsive to voltages having the same rate of change of phase as said video response from said aircraft.

41. A system for guiding aircraft to a landing comprising a radio echo device scanning in azimuth through a horizontal sector including a predetermined glide path and scanning in elevation through a vertical sector including said glide path, the scanning movement of said device in azimuth and elevation being independent, means comparing the phase of the video response of said device from an aircraft in said scanned sectors with the phase of the transmitted signal of said device, means constituting a first servo loop driven by the resultant of said comparison, a range indicator driven by said servo loop to indicate the range of said aircraft from said device, means comparing the phase of said video response with the phase of the scanning movement of said device, means constituting a second servo loop driven by the resultant of the last named phase comparison, an elevation indicator driven by said second servo loop to indicate the elevation of said aircraft with respect to said glide path, and a translating circuit applying said video response from said aircraft to said phase comparison means, said translating circuit being selectively responsive to voltages having the same rate of change of phase as said video response from said aircraft.

42. A system for guiding aircraft to a landing comprising a radio echo device scanning in azimuth through a horizontal sector including a predetermined glide path and scanning in elevation through a vertical sector including said glide path, the scanning movement of said device in azimuth and elevation being independent, means comparing the phase of the video response of said device from an aircraft in said scanned sectors with the phase of the transmitted signal of said device, means constituting a first servo loop driven by the resultant of said comparison, a range indicator driven by said servo loop to indicate the range of said aircraft from said device, means comparing the phase of said video response with the phase of the horizontal scanning movement of said device, means constituting a second servo loop driven by the resultant of the last named phase comparison, an azimuth indicator driven by said second servo loop to indicate the azimuth of said aircraft with respect to said glide path, means comparing the phase of said video response with the phase of the vertical scanning movement of said device, means constituting a third servo loop driven by the resultant of the last named phase comparison, an elevation indicator driven by said third servo loop to indicate the elevation of said aircraft with respect to said glide path, and a translating circuit applying said video response from said aircraft to said phase comparison means, said translating circuit being selectively responsive to voltage having the same rate of change of phase as said video response from said aircraft.

43. A system for guiding aircraft to a landing comprising a radio echo device scanning in azimuth through a horizontal sector including a predetermined glide path and scanning in elevation through a vertical sector including said glide path, the scanning movement of said device in azimuth and elevation being independent, means comparing the phase of the video response of said device from an aircraft in said scanned sectors with the phase of the transmitted signal of said device, means constituting a first servo loop driven by the resultant of said comparison, a range indicator driven by said servo loop to indicate the range of said aircraft from said device, means comparing the phase of said video response with the phase of the horizontal scanning movement of said device, means constituting a second servo loop driven by the resultant of the last named phase comparison, an azimuth indicator driven by said second servo loop to indicate the azimuth of said aircraft with respect to said glide path, a translating circuit applying said video response to said phase comparison means, said translating circuit being selectively responsive to voltages having the same rate of change of phase as said video response from said aircraft, said translating circuit comprising an electric discharge device having an input circuit, means deriving from the first servo loop a reference voltage having a phase which varies as the rate of change of range of said aircraft, means applying said video response to said input circuit, means comparing the phase of said video response with that of said reference voltage and means generating and applying as biasing voltage to said input circuit a negative voltage the magnitude of which varies as the rate of change of the phase difference between said video response and said reference voltage.

44. A system for guiding aircraft to a landing comprising a radio echo device scanning in azimuth through a horizontal sector including a predetermined glide path and scanning in elevation through a vertical sector including said glide path, the scanning movement of said device in azimuth and elevation being independent, means comparing the phase of the video response of said device from an aircraft in said scanned sectors with the phase of the transmitted signal of said device, means constituting a first servo loop driven by the resultant of said comparison, a range indicator driven by said servo loop to indicate the range of said aircraft from said device, means comparing the phase of said video response with the phase of the scanning movement of said device, means constituting a second servo loop driven by the resultant of the last named phase comparison, an elevation indicator driven by said second servo loop to indicate the elevation of said aircraft with respect to said glide path, a translating circuit applying said video response to said phase comparison means, said translating circuit being selectively responsive to voltages having the same rate of change of phase as said video response from said aircraft, said translating circuit comprising an electric discharge device having an input circuit, means deriving from the first servo loop a reference voltage having a phase which varies as the rate of change of range of said aircraft, means applying said video response to said input circuit, means comparing the phase of said video response with that of said reference voltage and means generating and applying as biasing voltage to said input circuit a negative voltage the magnitude of which varies as the rate of change of the phase difference between said video response and said reference voltages.

45. A system for guiding aircraft to a landing comprising a radio echo device scanning in azimuth through a horizontal sector including a predetermined glide path and scanning in elevation through a vertical sector including said glide path, the scanning movement of said device in azimuth and elevation being independent, means comparing the phase of the video response of said device from an aircraft in said scanned sectors with the phase of the transmitted signal of said device, means constituting a first servo loop driven by the resultant of said comparison, a range indicator driven by said servo loop to indicate the range of said aircraft from said device, means comparing the phase of said video response with the phase of the horizontal scanning movement of said device, means constituting a second servo loop driven by the resultant of the last named phase comparison, an azimuth indicator driven by said second servo loop to indicate the azimuth of said aircraft with respect to said glide path, means comparing the phase of said video response with the phase of the vertical scanning movement of said device, means constituting a third servo loop driven by the resultant of the last named phase comparison, an elevation indicator driven by said third servo loop to indicate the elevation of said aircraft with respect to said glide path, and a translating circuit applying said video response to said phase comparison means, said translating circuit being selectively responsive to voltages having the same rate of change of phase as said video response from said aircraft, said translating circuit comprising an electric discharge device having an input circuit, means deriving from the first servo loop a reference voltage having a phase which varies as the rate of change of range of said aircraft, means applying said video response to said input circuit, means comparing the phase of said video response with that of said reference voltage and means generating and applying biasing voltage to said input circuit a negative voltage the magnitude of which varies as the rate of change of the phase difference between said video response and said reference voltage.

References Cited in the file of this patent

UNITED STATES PATENTS

| | | |
|---|---|---|
| 2,414,469 | Isbister | Jan. 21, 1947 |
| 2,422,074 | Bond | June 10, 1947 |
| 2,429,636 | McCoy | Oct. 28, 1947 |
| 2,455,265 | Norgaard | Nov. 30, 1948 |
| 2,459,117 | Oliver | Jan. 11, 1949 |
| 2,459,482 | Bond | Jan. 18, 1949 |
| 2,464,249 | McCoy | Mar. 15, 1949 |
| 2,480,068 | Wolff | Aug. 23, 1949 |
| 2,493,774 | Moore | Jan. 10, 1950 |
| 2,516,296 | Brown | July 25, 1950 |
| 2,534,329 | Wilkerson | Dec. 19, 1950 |
| 2,585,855 | Sherwin et al. | Feb. 12, 1952 |

FOREIGN PATENTS

| | | |
|---|---|---|
| 124,653 | Australia | July 3, 1947 |